United States Patent
Pelly et al.

[11] Patent Number: 5,856,904
[45] Date of Patent: Jan. 5, 1999

[54] VOLTAGE AND CURRENT BASED CONTROL AND TRIGGERING FOR ISOLATOR SURGE PROTECTOR

[75] Inventors: Brian R. Pelly, Palos Verdes Estates, Calif.; Henry N. Tachick, Pound, Wis.

[73] Assignee: Dairyland Electrical Industries, Inc., Stoughton, Wis.

[21] Appl. No.: 749,453

[22] Filed: Nov. 15, 1996

[51] Int. Cl.$^6$ ........................ H02H 9/04
[52] U.S. Cl. .................. 361/111; 361/91; 361/88; 361/93
[58] Field of Search ............... 361/17, 54, 56, 361/57, 86, 87, 88, 91, 93, 100, 101, 111, 117, 118

[56] References Cited

U.S. PATENT DOCUMENTS

| | | | |
|---|---|---|---|
| 2,087,340 | 7/1937 | Davis | 307/90 |
| 3,198,989 | 8/1965 | Mahoney | 361/100 |
| 3,213,349 | 10/1965 | Gutzwiller | 363/53 |
| 3,571,660 | 3/1971 | Phillips | 361/56 |
| 3,636,409 | 1/1972 | Stephens, Jr. et al. | 361/43 |
| 3,769,926 | 11/1973 | Race | 114/270 |
| 3,904,931 | 9/1975 | Leidich | 361/56 |
| 3,930,977 | 1/1976 | Wood | 114/270 |
| 3,932,791 | 1/1976 | Oswald | 361/100 |
| 3,997,818 | 12/1976 | Bodkin | 361/100 |
| 4,117,345 | 9/1978 | Balcom | 307/95 |
| 4,118,749 | 10/1978 | Matuzaki et al. | 361/33 |
| 4,158,150 | 6/1979 | Dever | 307/117 |
| 4,186,418 | 1/1980 | Seiler | 361/91 |
| 4,217,618 | 8/1980 | Kellenbenz et al. | 361/56 |
| 4,237,509 | 12/1980 | Asplund | 361/56 |
| 4,297,739 | 10/1981 | Goldin et al. | 361/55 |
| 4,321,644 | 3/1982 | Brasfield | 361/56 |
| 4,322,767 | 3/1982 | El Hamamsy et al. | 361/56 |
| 4,331,884 | 5/1982 | Svedberg | 327/440 |

(List continued on next page.)

FOREIGN PATENT DOCUMENTS

| | | | |
|---|---|---|---|
| 1367890 | 9/1974 | United Kingdom | H02J 7/14 |
| 2160721 | 12/1985 | United Kingdom | H02H 9/00 |

OTHER PUBLICATIONS

U.S. app. No. 08/696,116, filed Aug. 13, 1996, by Pelly & Tachick, for "High Power DC Blocking Device for AC and Fault Current Grounding".

Brochure by Kirk Engineering Co. Inc. describing the "Kirk Cell" electrolytic switch, 1989 Apr.

(List continued on next page.)

*Primary Examiner*—Ronald W. Leja
*Attorney, Agent, or Firm*—Foley & Lardner

[57] ABSTRACT

An isolator surge protector (ISP) is provided which blocks DC current and passes AC current and AC and DC fault currents. The ISP includes a main bypass path, including main bypass path switching devices, that is connected in parallel with a DC blocking capacitor. Primary triggering of the main bypass path switching devices occurs when the voltage across the ISP exceeds a primary voltage trigger level. Repeated triggering of the bypass path switching devices, and high current discharge of the high voltage DC blocking capacitor through the bypass path, under abnormal steady state voltage conditions, is prevented by initiating a secondary triggering period following primary triggering of the bypass path switching devices. During the extended secondary triggering period, triggering of the bypass path switching devices occurs at a low secondary voltage trigger level. Primary triggering of the bypass path switching devices preferably also occurs when the AC current in the DC blocking capacitor exceeds a selected primary current trigger level, thereby protecting the DC blocking capacitor from damage due to excessive currents. Primary triggering due to high AC current levels in the DC blocking capacitor is also followed by a secondary triggering period during which triggering of the bypass path SCRs occurs at the low secondary voltage trigger level. The ISP preferably also provides a warning indication when primary triggering of the bypass path switching devices occurs.

24 Claims, 13 Drawing Sheets

U.S. PATENT DOCUMENTS

| | | | |
|---|---|---|---|
| 4,475,139 | 10/1984 | Chadwick | 361/91 |
| 4,491,742 | 1/1985 | Akamatsu | 327/442 |
| 4,509,089 | 4/1985 | Svedberg | 361/100 |
| 4,697,219 | 9/1987 | Mitsuoka | 361/93 |
| 4,958,250 | 9/1990 | Kotski | 361/40 |
| 5,155,674 | 10/1992 | Tanoue et al. | 361/91 |
| 5,436,786 | 7/1995 | Pelly et al. | 361/56 |

OTHER PUBLICATIONS

Brochure entitled "Rustrol Polarization Cell" by International Corrosion Control, Inc., no date.

H.A. Cloud, et al, "Stray Voltage Problems with Dairy Cows", North Central Regional Extension, Publication 125, Agricultural Extension Service, University of Minnesota, 1980 no month.

J.G. Kappenman, et al., "GIC Mitigation: A Neutral Blocking/Bypass Device to Prevent the Flow of GIC in Power Systems", no date.

John G. Kappenman & Scott R. Norr, "Neutral Blocking Device Combats Currents Caused by Geomagnetic Storms", no date.

Letter from Henry N. Tachick of Dairyland Electrical Industries, Inc. to R. S. Howard of Los Angeles Dept. of Water and Power describing a proposal for an isolator surge protector, dated Mar. 13, 1989.

Letter dated Dec. 3, 1993, from Paul Fleury of Marine Services to Technical Director, American Boat and Yacht Council, Inc.

Paper dated Jan. 3, 1993, entitled "Galvanic Isolator, Installation Instructions, Quicksilver Part #18478A1".

Paper dated Dec. 28, 1993 entitled "Testing Galvanic Isolators".

Paper by Marine Services dated Jan. 12, 1994, entitled "Galvanic Isolator".

Product brochure published by Dairyland Electrical Industries, Inc. for Solid–State Isolator/Surge Protector, published in the United States prior to Dec. 21, 1992.

Addendum to Isolator/Surge Protector Brouchure by Dairyland Electrical Industries, Inc., published in the United States prior to Dec. 21, 1992

5,856,904

VOLTAGE AND CURRENT BASED CONTROL AND TRIGGERING FOR ISOLATOR SURGE PROTECTOR

FIELD OF THE INVENTION

This invention pertains generally to the field of electrical systems and apparatus therefor, and more particularly to devices for blocking the flow of DC current in such systems while providing AC and fault current grounding.

BACKGROUND OF THE INVENTION

Isolator surge protectors (ISPs) are electrical devices that are designed to block the flow of unwanted DC current in electrical systems while simultaneously allowing the flow of normal AC current to ground. ISPs also allow the flow of transient and fault currents to ground. Such fault currents may be several orders of magnitude higher than the normal operating currents of the system in which the ISP is used.

ISPs are used in various high power electrical system applications. High power transformers are used for the transmission and distribution of electrical power. These three phase transformers include a neutral line which is connected to ground. Unwanted stray DC current can flow from the ground into the transformer through this neutral to ground connection. Such transformers are not designed to accommodate a DC current flowing through the transformer windings. DC currents as low as several amperes can cause partial core saturation, resulting in excessive power losses in the transformer (i.e., excessive heating), a drop in system voltage, the introduction of undesirable harmonics, and a significant increase in noise level. Sources of DC current that can cause this problem include geomagnetically induced current (GIC) caused by solar flares, stray DC current from rapid transit systems typically found in large cities, and stray DC current associated with high-voltage DC transmission systems, particularly when operating in the monopolar mode (i.e, earth return mode). Unwanted DC current in the high power three phase transformer can be blocked by inserting an ISP between the transformer neutral connection and ground. The ISP both blocks DC current and simultaneously allows the flow of normal AC current to ground. The ISP also allows for the flow of transient fault currents to ground. Such fault currents can be several orders of magnitude higher than the normal currents found in the transformer.

ISPs may also be used in association with systems that protect metal structures against corrosion by the application of a DC bias voltage. Many metallic structures and systems are protected against corrosion by cathodic methods. For example, metallic gas transmission and distribution lines are protected against corrosion to prevent gas leaks, particularly in certain environments. Metal encased high-voltage underground transmission lines, and the metal hulls of ships, are other examples of metallic objects which are often cathodically protected.

The most common method of cathodic corrosion protection of metallic systems is to apply a negative DC potential to the system to be protected. The negative DC potential applied to the system will typically be in the 0.6 volt to 3.0 volt range relative to ground. The cathodically protected system is isolated from ground to prevent the flow of DC current from the protected system. While this procedure helps to eliminate corrosion, it introduces a potential safety problem. Often, the protected system is an inherent part of an AC power system, or is coupled to such a power system through resistive, capacitive, or inductive coupling. In the event of a fault, e.g., a short circuit, within the power system, or between the power system and the protected device, the voltage on the electrically isolated corrosion protected system may rise to unsafe levels.

To prevent such cathodically protected systems from reaching unsafe voltage levels in the event of a fault, lightning, switching transient, or other system disturbance, it is desirable that the protected system be connected to ground through an ISP or similar device. The ISP presents a high impedance to DC, at least up to the DC voltage level of interest, but presents a low impedance to AC at all times so that the voltage level on the corrosion protected system is limited to values safe for personnel and equipment.

Another application of ISPs is for the prevention of stray electrical currents associated with farm installations, particularly dairying equipment. Such stray electrical currents can present a significant economic problem for farm operations. Dairy operations are susceptible to stray electricity because cows are extremely sensitive to electricity, much more so that humans, and will respond to potentials as low as one volt or less. One solution to such a problem is to insert a blocking device, such as an ISP, between the primary and secondary neutrals of the distribution transformers serving the farm. The blocking device used opens the link between the transformer neutrals during normal operation, and closes the link very rapidly anytime the voltage between the neutrals exceeds a predetermined level. Such an overvoltage might be caused by a transformer failure, lightning surge, or other surge condition. For dairy farm applications, the blocking device will normally be required to block normal AC currents as well as DC.

Known ISPs typically include a main DC blocking (or AC bypass) capacitor which prevents the flow of DC current, while allowing the flow of normal AC currents to ground. Such ISPs preferably also include a bypass circuit, which provides a low impedance path across the capacitor when the voltage across the capacitor exceeds a predetermined level as a result of an AC or DC fault or surge condition. High speed electronic switching devices capable of handling large currents, such as silicon controlled rectifiers (SCRs), have been used to implement the low impedance bypass path. However, for applications in which the ISP is connected to systems which are subject to an external DC bias, such as cathodically protected systems, the external DC bias may be greater than the turnoff voltage of the switching devices employed in the bypass circuit. Thus, the external DC bias can operate to hold the electronic switches of the DC blocking device in a conductive state, thereby maintaining the low impedance path, and bypassing the DC blocking capacitor, even though the event which caused the triggering of the switches has ended. In such a state, the bypass path is stuck in conduction, with the external DC bias preventing proper operation of the DC blocking device.

The isolator surge protector described in U.S. Pat. No. 5,436,786, to Pelly, et al., resolves the problem of an ISP being stuck in conduction by the presence of a DC bias voltage. In accordance with Pelly, et al., an ISP preferably includes an auxiliary bypass path which short circuits the high current capacity SCRs of the main bypass path after the triggering event has passed. The auxiliary bypass path thus shunts the DC current which is maintaining the SCRs in a conducting state away from the SCRs, such that the voltage across the SCRs falls below their holding voltages. Thus, the SCRs will not become permanently stuck in conduction by the external DC bias.

In high voltage ISP applications, the energy stored in the main DC blocking capacitor at the instant that the switching devices (SCRs) in the bypass circuit are fired is relatively high. In accordance with Pelly, et al., an inductor is preferably put in series with the main DC blocking capacitor to prevent the capacitor from dumping all of its energy into the SCRs in the bypass circuit within a short time (a few tens of microseconds) after the SCRs are triggered. This energy dump may be acceptable at low voltage levels, where neither the energy stored in the capacitor, nor the instantaneous SCR voltages, are too great. At high voltage, however, the rapid dump of a large amount of energy from the capacitor could damage or destroy the bypass circuit switching devices. The inductor prevents an immediate energy dump from the capacitor. It greatly alleviates the stress on the bypass circuit SCRs by letting the capacitor dissipate its energy slowly, over a multiple number of cycles of decaying oscillations. The ISP control circuitry, which controls triggering of the SCRs in the bypass circuit, ensures that once the oscillatory discharge is set in motion (by initially firing an SCR) the SCRs in the main bypass circuit are kept in essentially continuous conduction (i.e., without the instantaneous blocking voltage applied across the bypass circuit being allowed to rise above a few volts), until the oscillation has been completed. Thus, after the bypass circuit switching devices are initially triggered at a high triggering level, e.g., 300 volts, the ISP controller establishes a period, e.g., 80 milliseconds, wherein the bypass circuit switching devices are fired at a much lower voltage level, e.g., 5 volts, until all of the energy initially stored in the DC blocking capacitor is dissipated. Without this feature, the oscillation resulting from the energy stored in the blocking capacitor and the series connected inductor would be reflected from the ISP back to the power system to which the ISP is connected, rather than being kept as an internal event within the ISP.

In previously known ISPs of the type described, continuous operation of the ISP outside of normal rated operating conditions can cause damage to the ISP's DC blocking capacitor. If the sum of a steady state external DC bias voltage applied across the ISP, plus the steady state peak AC voltage due to the AC current in the DC blocking capacitor, is higher than the trigger voltage level of the ISP, the instantaneous voltage across the capacitor will repeatedly reach the trigger level. This will cause repeated triggering, and repeated rapid high current discharge of the DC blocking capacitor through the bypass circuit SCRs. Continuous operation under such conditions can cause excessive power dissipation and possible failure of the DC blocking capacitor.

The less the DC bias voltage applied across an ISP the more AC voltage can be developed across the DC blocking capacitor, and the more AC current can flow through the capacitor, without the voltage across the ISP itself reaching the trigger voltage level. Thus, particularly at low values of DC bias voltage, the AC current through the ISP DC blocking capacitor could exceed the rms current rating of the capacitor without initiating triggering of the ISP bypass path. Continuous high AC current operation of the ISP could cause damage to the DC blocking capacitor. Previously known ISPs, which provide triggering of the bypass circuit SCRs based only on the voltage across the ISP exceeding a triggering voltage level, do not provide protection for the DC blocking capacitor by triggering of the bypass circuit SCRs in the case where the total AC current rating of the capacitor is exceeded but the trigger voltage level of the ISP is not reached.

SUMMARY OF THE INVENTION

In accordance with the present invention, an isolator surge protector (ISP) is provided which blocks DC current, passes AC current, and self-limits the voltage across it under excessive voltage and current conditions. The ISP provided is particularly suitable to applications such as connecting a cathodically protected metal structure to ground, to provide DC isolation of the structure while providing for the free flow of AC current, and AC and DC fault currents, from the structure to ground. An ISP in accordance with the present invention may, however, be employed in any application requiring the blocking of DC current and the passing of normal AC currents and AC and DC fault currents.

In accordance with the present invention, an ISP is controlled to prevent repeated triggering at a high primary triggering voltage of the switching devices in the main bypass path under abnormal high voltage steady state conditions, thereby preventing repeated rapid high current discharge of the ISP's DC blocking capacitor. This feature of the present invention prevents excessive power dissipation and possible failure of the DC blocking capacitor under abnormal steady state operating conditions. In accordance with the present invention, the ISP is preferably also controlled such that the main bypass path switching devices are triggered to prevent damage to the DC blocking capacitor when the rms AC current through the capacitor exceeds the current rating of the capacitor. An ISP in accordance with the present invention preferably also provides a warning indication that the voltage and/or current applied to the ISP is beyond the normal operating range, and that triggering of the bypass path is occurring.

An ISP in accordance with the present invention includes a DC blocking capacitor (AC bypass capacitor) which blocks normal levels of DC current while allowing the free flow of normal AC currents. A main bypass path circuit is connected across the DC blocking capacitor. The main bypass path includes high power switching devices, such as SCRs, which are triggered on to provide a low impedance bypass path across the DC blocking capacitor under fault conditions. An ISP control and firing circuit provides primary triggering signals to the main bypass path SCRs when the voltage across the ISP exceeds a selected primary voltage trigger level. To prevent overheating of and damage to the DC blocking capacitor due to repeated triggering at an abnormally high steady state voltage level in excess of normal ISP operating conditions, a secondary triggering period is initiated by the ISP control and firing circuit immediately following each primary triggering event at the primary voltage trigger level. During the secondary triggering period, the ISP control and firing circuit triggers the SCRs in the main bypass path at a secondary voltage trigger level across the ISP which is less than the primary voltage trigger level. The secondary triggering period is maintained for an extended period of time, e.g., at least one second, before a new triggering event is allowed to occur at the primary voltage trigger level. Institution of the secondary triggering period prevents repeated retriggering at line frequency at the high primary voltage trigger level, thereby substantially reducing the power dissipation of the DC blocking capacitor.

To protect the DC blocking capacitor from damage due to excessive AC currents through the capacitor which, nevertheless, do not cause the primary voltage trigger level of the ISP to be reached, an ISP in accordance with the present invention preferably provides for primary triggering of the SCRs in the main bypass path under either of two conditions. First, as described previously, primary triggering preferably occurs when the total instantaneous voltage across the ISP reaches a set absolute maximum value, the primary voltage trigger level. Second, primary triggering of the bypass path switching devices also preferably occurs when the current in the DC blocking capacitor reaches a set maximum level, the primary current trigger level, whether or not the total instantaneous voltage across the ISP has reached the primary voltage trigger level. In either case, whether the initial primary triggering event is the result of the total instantaneous voltage across the ISP reaching the primary voltage trigger level, or the current in the DC blocking capacitor reaching the primary current trigger level, the primary triggering event is preferably followed by an extended period of secondary triggering, as described above, during which triggering of the SCRs in the main bypass path occurs at a low secondary voltage trigger level and AC current is, therefore, essentially diverted from the DC blocking capacitor into the bypass path SCRs.

In accordance with the present invention, an indication is preferably provided whenever primary triggering occurs. This indication, such as a flashing LED, provides a warning that the voltage and/or current applied to the ISP is beyond the normal operating range, and that triggering of the main bypass path SCRs is occurring.

After completion of the extended period of secondary triggering, during which the main bypass path SCRs are triggered at the low secondary voltage trigger level, the SCRs in the main bypass path are turned off to restore the DC blocking capability of the ISP. Due to the presence of a DC bias voltage in the system of which the ISP is a part, a DC component of current may have built up in the main bypass path SCRs during the secondary triggering period. Therefore, the main bypass path SCRs can become stuck in conduction with a unidirectional pulsating current (AC plus DC current). In order to commutate off the main bypass path SCRs, the ISP preferably includes an auxiliary bypass path, including an auxiliary bypass path switching device, such as a MOSFET, which is switched on briefly by the ISP control and firing circuit following completion of the secondary triggering period.

Any remaining current in the main bypass path SCRs is thus diverted through the auxiliary bypass switch, thereby commutating off the main bypass path SCRs in the event that they are stuck in conduction.

During the secondary triggering period, DC current, along with AC current, is allowed to flow through the main bypass path. Thus, DC energy will become stored in the inductances associated with the system to which the ISP is attached, as well as in the internal inductances of the ISP itself. For example, DC energy may become stored in the windings of a power transformer and the transmission system to which the ISP is connected. This stored DC energy will cause the voltage across the ISP to rise once the main bypass path SCRs have been turned off, and could cause a false retriggering at the primary voltage trigger level. To dissipate this energy, a voltage clamp circuit is preferably provided which prevents any voltage rise across the ISP, beyond a certain clamp voltage level, following completion of the secondary triggering period, and commutation off of the main bypass path SCRs. The voltage clamp preferably bypasses the DC current through a switching device into a resistor, which dissipates the stored system energy. The voltage clamping period is preferably allowed to occur for a duration, e.g., one second, sufficient to dissipate the stored DC energy before primary triggering of the SCRs in the main bypass path is reenabled. When the DC component of the current in the ISP reaches zero, all of the DC energy stored in the system inductances has been removed. After completion of the voltage clamping period, operation of the ISP returns to its original pre-fault state. Primary triggering of the main bypass path SCRs may then occur due to either the voltage level across the ISP exceeding the primary voltage trigger level or the AC current in the DC blocking capacitor exceeding the primary current trigger level.

Triggering of the main bypass path SCRs, as well as control of the auxiliary bypass path and the voltage clamp circuit, is provided by an ISP control and firing circuit. The ISP control and firing circuit may be implemented using conventional analog or digital components, or any combination thereof, and may be a microprocessor based system. The ISP control and firing circuit is preferably an autonomous, self-powered, system that is provided with power for operation during the primary and secondary triggering periods by energy stored on a storage capacitor from the voltage applied across the ISP prior to primary triggering of the main bypass path SCRs. In some situations, such as where the main bypass path SCRs are to be triggered due to an AC current through the DC blocking capacitor which exceeds the primary current trigger level, the peak AC current at which primary triggering is required will not produce sufficient peak voltage across the ISP to provide for operation of the ISP control and firing circuit. A voltage boosting add-on circuit may preferably be provided to boost the voltage level provided to the ISP control and firing circuit storage capacitor from the voltage level across the ISP when AC current dependent primary triggering of the main bypass path SCRs at low voltage levels is required. The add-on circuit preferably employs a transformer having a turns ratio such that the boosted voltage level provided to the ISP control and firing circuit storage capacitor is sufficient for primary triggering of the main bypass path SCRS.

An ISP in accordance with the present invention also preferably provides for rapid firing of the main bypass path SCRs when a fast rising voltage, such as is caused by a lightning strike, appears across the ISP. For a fast rising voltages, the ISP control and firing circuit, which normally initiates primary triggering of the main bypass path SCRs, cannot react quickly enough to fire the SCRs to prevent dangerously high voltage levels from appearing across the ISP. Thus, an auxiliary, virtually instantaneous, SCR firing mechanism is preferably provided which limits the peak voltage across the ISP even under severe lightning strike conditions. Such an auxiliary firing mechanism may be provided via the use of a zener diode connected between the anode and gate of each of the main bypass path SCRs. The zener diodes trigger the main bypass path SCRs into conduction when the voltage across the ISP exceeds an auxiliary voltage trigger level such that the breakover voltage of the zener diodes is exceeded. The auxiliary voltage trigger level is preferably sufficiently above the primary voltage trigger level such that the auxiliary SCR firing mechanism, via the zener diodes, plays no part in the operation of the ISP when the SCRs in the main bypass path are fired at normal line frequencies.

Further objects, features, and advantages of the present invention will be apparent from the following detailed description when taken in conjunction with the accompanying drawings.

DETAILED DESCRIPTION OF THE INVENTION

Figure 1:
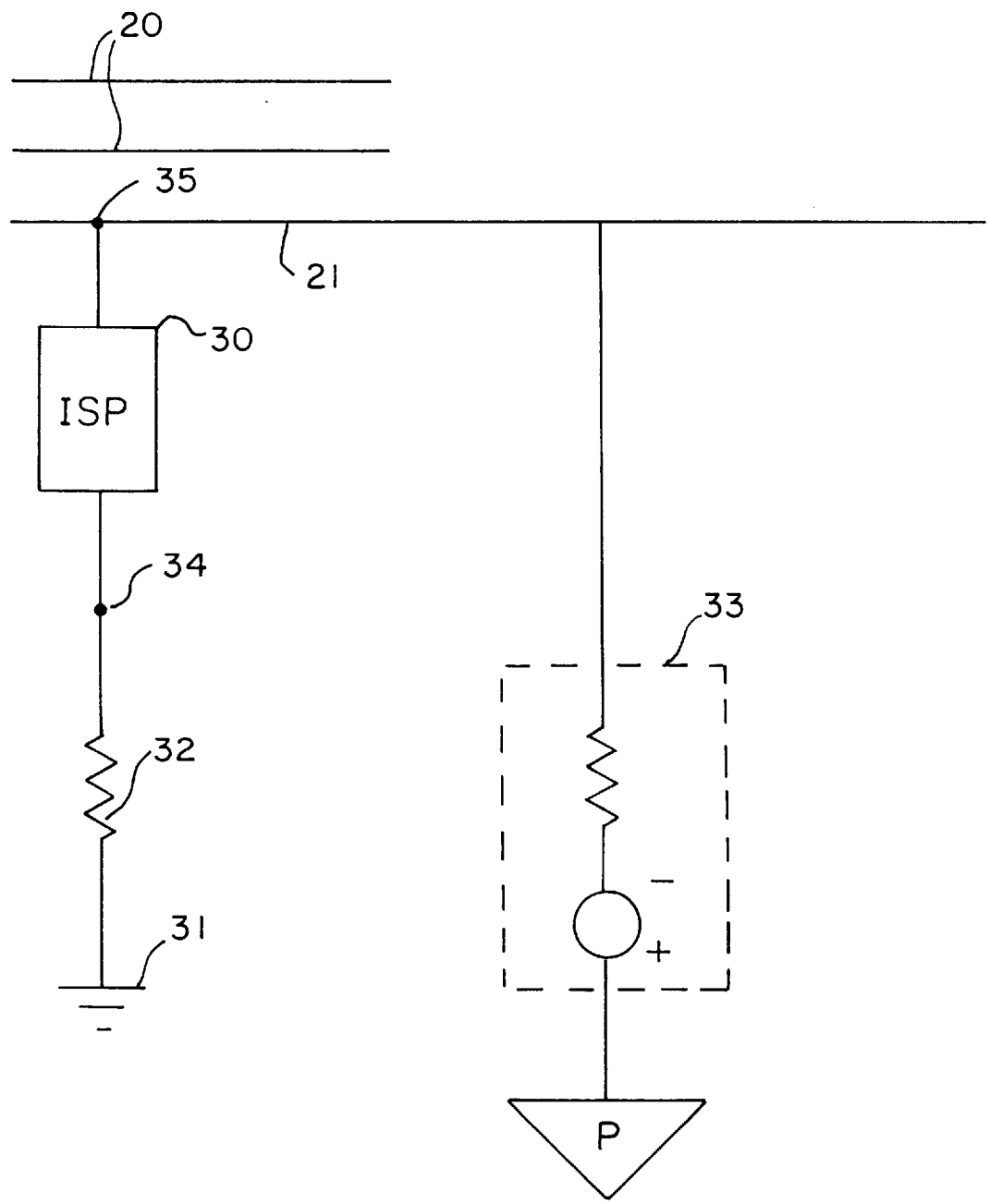
FIG. 1 is a schematic circuit diagram of a power system including an isolator surge protector in accordance with the present invention, showing one application of the present invention.

With reference to the drawings, a schematic view of the interconnection of power system lines 20 and a DC isolated structure 21 is shown in FIG. 1 for purposes of illustrating an exemplary application of an isolator surge protector (ISP) 30 in accordance with the present invention. The isolated structure 21 may be, for example, a pipe used in a metal encased high voltage system, a ground stake, or a gas transmission line. Because of conducting line resistance, imperfect electrical contact with the structure 21, and the character of the ground 31, a certain finite resistance 32 exists between the structure 21 and the true ground potential. An external DC source 33 may be connected to the structure 21 to apply a DC bias voltage to the structure 21 to cathodically protect the structure from corrosion by minimizing the oxidation of the structure 21. The ISP 30 may be connected to the structure 21 at node 35 and the ground 31 at node 34 as illustrated. The ISP 30 normally presents a very high DC impedance between nodes 35 and 34, so that substantially no DC current flows between the nodes. Thus, DC voltages appearing on the structure 21 are not transmitted through the ISP 30 to the ground 31. In the event, however, of a fault on the structure 21, such that voltages above a selected primary voltage trigger level are applied to the structure 21, the ISP 30 switches to provide a low impedance path between the nodes 35 and 34, thereby shunting any fault current back to the ground 31. For example, if the power system lines 20 short circuit to the structure 21, the ISP 30 provides a path to ground 31.

It should be understood that the exemplary application illustrated in FIG. 1 is only one of many potential applications for ISPs in accordance with the present invention. An ISP in accordance with the present invention may be used in any application requiring the blocking of DC current and the passing of normal AC currents and AC and DC fault currents. For example, the ISP 30 may be connected between the neutral of a wye-connected three phase power transformer and ground. In such an application, normal AC current will be allowed to flow freely through the transformer windings, but stray DC current, such as geomagnetically induced current (GIC), will be blocked by the ISP 30 and prevented from flowing into the transformer. Under fault conditions, the ISP 30 becomes an effective short circuit, allowing free flow of AC and DC fault currents from the transformer through the ISP to ground.

Figure 2:
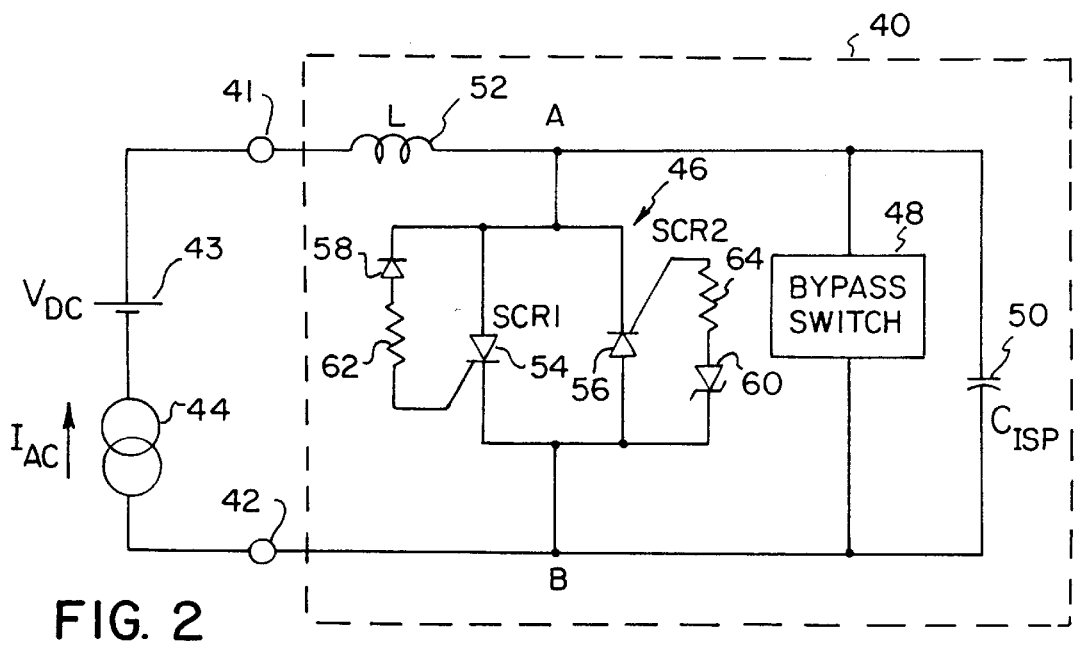
FIG. 2 is a schematic circuit diagram of a known isolator surge protector.

A typical prior art ISP is shown in simplified block diagram form in FIG. 2, and is described herein in order to illustrate limitations of prior art ISPs which are remedied by an ISP in accordance with the present invention. The prior art ISP 40 is illustrated as connected by ISP terminals 41 and 42 to a structure which applies a steady state DC voltage level $V_{DC}$ 43 and a steady state AC current level $I_{AC}$ AC 44 to the ISP 40. The prior art ISP 40 includes a main bypass path 46, an auxiliary bypass switch 48, and a DC blocking capacitor 50 connected in parallel with each other and in series with an inductor 52 across the terminals 41 and 42 of the ISP 40. The DC blocking capacitor 50 blocks DC current from passing between the terminals 41 and 42 of the ISP 40, while allowing the flow of normal AC operating current through the ISP 40. The remainder of the ISP circuit 40 only plays a role under transient or steady state external system fault conditions. The main bypass path 46 includes antiparallel connected switching devices, e.g., SCRs, 54 and 56. Zener diodes 58 and 60, along with current limiting resistors 62 and 64, are connected between the anodes and gates of each SCR 54 and 56, respectively. The breakover voltage of the zener diodes 58 and 60 determines the primary voltage trigger level of the main bypass path SCRs 54 and 56. Under a fault condition, when the instantaneous voltage across the ISP, in either polarity, exceeds the primary voltage triggered level, one of the SCRs 54 or 56 is triggered into conduction, thereby creating a low impedance bypass path across the ISP 40. The low impedance bypass path 46 conducts the AC or DC fault current safely across the ISP 40. The auxiliary bypass switch 48 plays no part in the triggering of the SCRs 54 and 56 in the main bypass path 46. The auxiliary bypass switch 48 is triggered in response to the voltage waveform across the ISP to provide a low impedance auxiliary bypass path across the ISP 40, after a fault condition has cleared, to commutate off the main bypass path SCRs 54 and 56 which may become stuck in conduction during the fault triggering period due to the presence of an external DC bias holding the SCRs in a conductive state.

The prior art ISP 40 has several undesirable limitations when operating under certain conditions that are outside of the normal rated operating conditions of the ISP. For example, when the ISP 40 is operating under abnormal steady state operating conditions wherein the steady state external DC bias voltage $V_{DC}$, plus the steady state peak AC voltage due to the AC current $I_{AC}$ in the bypass capacitor 50, rises higher than the trigger voltage level of the ISP, the instantaneous voltage across the blocking capacitor 50 will repeatedly reach the trigger level, causing repeated triggering of the main bypass path SCRs 54 and 56 up to twice each cycle. This repeated triggering causes repeated rapid high current discharge of the DC blocking capacitor 50 through the main bypass path SCRs 54 or 56. Continuous operation under these conditions can cause excessive power dissipation and possible failure of the blocking capacitor 50. An exemplary and approximate worse case analysis of the problem follows. Each time the blocking capacitor 50, with capacitance $C_{ISP}$, discharges from the trigger voltage level $V_{TRIG}$, energy of ½ $C_{CISP}V_{TRIG}^2$ is dissipated. This energy dissipation is distributed between the internal resistance of the DC blocking capacitor 50, the external wiring, and the SCRs 54 and 56. Such energy dissipation could occur twice per cycle, giving an average power dissipation of 2×½ $C_{ISP}V_{TRIG}^2$×f, where f is the frequency of the AC current $I_{AC}$. For a DC blocking capacitor 40 with a capacitance of $C_{ISP}$=10,000 μF, a trigger voltage of 12V, and a frequency of 60 Hz, the total average power dissipated is 86W. For a trigger voltage of 20V, the total average power dissipation increases to 240W. These levels of continuous average power dissipation can result in failure of the DC blocking capacitor 50.

A second limitation of the prior art ISP 40 is that potentially damaging rms current levels, exceeding the rms current rating of the DC blocking capacitor 50, can flow through the capacitor 50 under abnormal steady state operating conditions, without the triggering voltage level of the ISP 40 ever being reached, and, therefore, without the main bypass path SCRs 54 and 56 ever being activated. The less the DC bias voltage $V_{DC}$ applied across the ISP 40, the more AC voltage can be developed across the DC blocking capacitor 50, and the more AC current can flow through the capacitor 50, without the trigger voltage level of the ISP 40 ever being reached. Thus, at low values of DC bias voltage, the AC current through the DC blocking capacitor 50 is more likely to exceed the rms current rating of the capacitor 50. As an example, if the absolute voltage trigger level of the ISP is 20V, then, with zero DC bias voltage, a capacitor of 10,000 μF would carry an rms current of 53 A at 60 Hz before the 20V trigger level of the ISP 40 is reached. This current level is well above the 30 A rating of the typical preferred 10,000 μF capacitor component used in the ISP 40.

Figure 3:
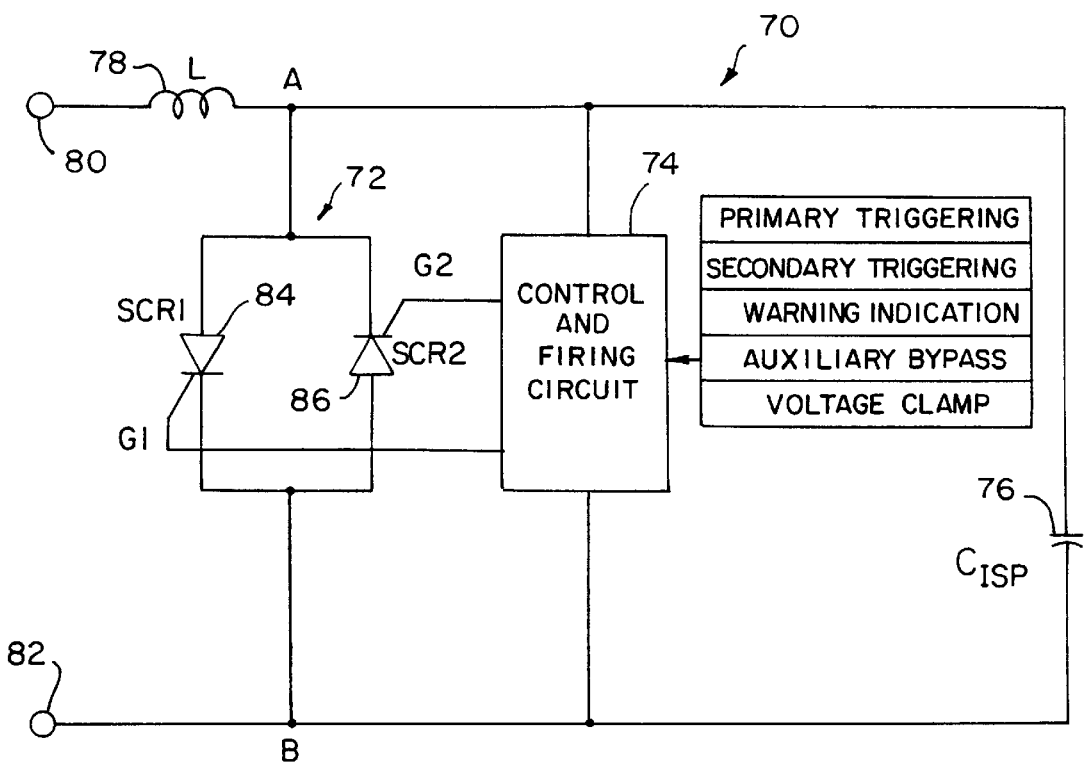
FIG. 3 is a schematic circuit diagram of an isolator surge protector in accordance with the present invention.

An ISP 70 in accordance with the present invention, which corrects the undesirable operating limitations of the prior art ISP 40, is described with reference to the schematic block diagram of FIG. 3. The ISP 70 of the present invention includes a main bypass path 72, an ISP control and firing circuit 74, and a DC blocking capacitor 76 connected in parallel with each other at nodes A and B of the ISP 70 and in series with an inductor 78 across the terminals 80 and 82 of the ISP 70. Under normal operating conditions, the main bypass path 72 and the ISP control and firing circuit 74 provide high impedance blocking of both AC and DC across the terminals 80 and 82 of the ISP 70. The DC blocking capacitor 76, which may also be known as, and functions as, an AC bypass capacitor, blocks DC current from passing between the terminals 80 and 82 of the ISP 70 while allowing the flow of normal AC operating current across the ISP 70. The remainder of the ISP circuit 70, including the main bypass path 72, and the control and firing circuit 74, only plays a role under abnormal system fault conditions.

The main bypass path 72 includes anti-parallel connected switching devices 84 and 86 connected between nodes A and B of the ISP 70. The switching devices 84 and 86 are preferably implemented as power switching devices capable of handling large fault currents, such as silicon controlled rectifiers (SCRs). While shown conceptually in FIG. 3 as single SCRs 84 and 86, for high power applications it is preferable to implement the main bypass path 72 using multiple pairs of SCRs 84 and 86 connected in parallel with each other. Multiple parallel SCR pairs are employed to increase the current handling capability of the ISP 70. With multiple paralleled SCRs, high fault currents can be divided among many SCRs, minimizing the stresses on each individual SCR, and thereby minimizing the chances of SCR failure.

Triggering of the main bypass path SCRs 84 and 86 is provided by signals applied to the gates of the SCRs 84 and 86 from the ISP control and firing circuit 74. When the SCRs 84 and 86 are triggered into conduction, a low impedance bypass path is created between the terminals 80 and 82 of the ISP 70. Both AC and DC fault currents are conducted through the main bypass path 72 of the ISP 70 when the SCRs 84 and 86 are triggered into conduction, and any energy stored in the DC bypass capacitor 76 is dissipated through the main bypass path SCRs 84 and 86.

The ISP control and firing circuit 74 preferably implements the following functions, all of which will be described in more detail below. The control and firing circuit 74 preferably provides primary triggering of the main bypass path SCRs 84 and 86 when either the absolute voltage across the ISP 70 or the current in the DC blocking capacitor 76 exceeds selected limits. The control and firing circuit 74 preferably initiates a period of secondary triggering, at a low voltage trigger level across the ISP, following primary triggering. The control and firing circuit 74 preferably provides a warning indication when primary triggering occurs, indicating that the external system voltages and/or currents are beyond their normal values. The control and firing circuit 74 also preferably provides an auxiliary bypass path to shunt current from the main bypass path to commutate off the main bypass path SCRs 84 and 86 should they become stuck in conduction due to a DC bias voltage applied across the ISP 70, and a voltage clamp to dissipate DC energy that may have become stored in system inductances during the secondary triggering period.

The ISP control and firing circuit 74 preferably initiates triggering of the main bypass path SCRs 84 and 86 when the instantaneous voltage level across the terminals 80 and 82 of the ISP 70 exceeds a primary voltage trigger level. (Technically, the ISP control and firing circuit monitors the voltage across the nodes A and B, which is directly related to the voltage across the terminals 80 and 82.) In order to prevent overheating and damage to the DC blocking capacitor 76 due to continuous repeated triggering of the main bypass path SCRs 84 and 86 at the primary voltage trigger level, the ISP control and firing circuit 74 preferably initiates a secondary triggering period immediately following each triggering event at the primary voltage trigger level. During the secondary triggering period, the main bypass path SCRs 84 and 86 are triggered each time the voltage level across the ISP exceeds a secondary voltage trigger level, which is a low voltage level substantially below that of the primary voltage trigger level. The secondary triggering period is maintained for an extended period of time, e.g., at least one second, before a new triggering event is allowed to occur at the primary voltage trigger level. Institution of the secondary triggering period prevents repeated retriggering at line frequency at the primary voltage trigger level when the steady state DC bias plus AC voltage level across the ISP 70 exceeds the primary voltage trigger level. This method of controlling the triggering of the main bypass path SCRs 84 and 86 substantially reduces the power dissipation through the DC blocking capacitor 76, thereby minimizing the potential for damage to the capacitor 76.

The following example illustrates the potential reduction in power dissipation in the DC blocking capacitor 76 when a method for controlling an ISP in accordance with the present invention is employed. Assume a primary voltage trigger level of 20V, and a bypass capacitor 76 of capacitance $C_{ISP}$=10,000 µF, as in the example discussed previously with respect to the prior art ISP 40 of FIG. 2. Further, assume a secondary voltage trigger level of 2.5V, and a secondary triggering period of 2 seconds. In such a case, the average power dissipation due to primary triggering, assuming this occurs once every two seconds (i.e., as soon as the secondary triggering period ceases) equals ½×10,000×10⁻⁶×20²×½=1W. Average power dissipation due to two secondary triggering events per cycle at 60 Hz equals 2×½× 10,000×10⁻⁶×2.52×60=3.75 W. Total average power dissipation due to primary and secondary triggering, therefore, equals 1+3.75=4.75 W. This amount of power dissipation compares with the previously calculated average value of 240 W, for repeated primary triggering at 20V. It is apparent that power dissipation of the DC blocking capacitor 76 is brought well within safe levels by providing an extended secondary triggering period.

Primary triggering at a selected instantaneous voltage level across the terminals 80 and 82 of the ISP 70, however, does not resolve the undesirable operational limitation of prior art ISPs wherein excessive AC currents may cause damage to the DC blocking capacitor 76 without the voltage across the ISP 70 ever exceeding the primary voltage trigger level. Therefore, the ISP control and firing circuit 74 of the present invention preferably also provides for initial primary triggering of the main bypass path SCRs 84 and 86 when the current in the DC blocking capacitor 76 exceeds a selected primary current trigger level. Primary triggering based on the AC current level in the DC blocking capacitor 76 is preferably followed by an extended period of secondary triggering, during which the main bypass path SCRs 84 and 86 are triggered at the low secondary voltage trigger level across the terminals 80 and 82 of the ISP 70. During this extended period of secondary triggering, the AC current through the ISP is diverted from the DC blocking capacitor 76 through the SCRs 84 and 86.

The control and firing circuit 74 also preferably provides a warning indication whenever primary triggering occurs. The warning indication may be, for example, a visual indication provided by a flashing light-emitting diode (LED), which provides a visual warning that the voltage and/or current applied to the ISP 70 is beyond the normal operating range, and that primary triggering is occurring.

Following completion of the secondary triggering period, the control and firing circuit 74 preferably provides an auxiliary bypass path across the main bypass path switching devices 84 and 86, to divert current from the main bypass path SCRs 84 and 86 to thereby commutate them off should they become stuck in conduction during the secondary triggering period due to the presence of a DC bias voltage across the ISP 70. The control and firing circuit 74 also preferably provides a voltage clamp feature for dissipating DC energy that may become stored in the inductances associated with the system to which the ISP 70 is attached, as well as in the ISP 70 itself, during the secondary triggering period.

An exemplary and preferred ISP control and firing circuit 74 in accordance with the present invention is illustrated in and described with reference to the detailed schematic circuit diagram of FIGS. 4–7. Lines connecting the circuit components of the control and firing circuit that are illustrated in different figures are labeled with the letters C-AA. It should be understood, before proceeding, that an ISP control and firing circuit 74 in accordance with the present invention may be implemented using various other circuits and circuit components than those that are to be described, and may be implemented using microprocessors, digital signal processors, and the like.

Figure 4:
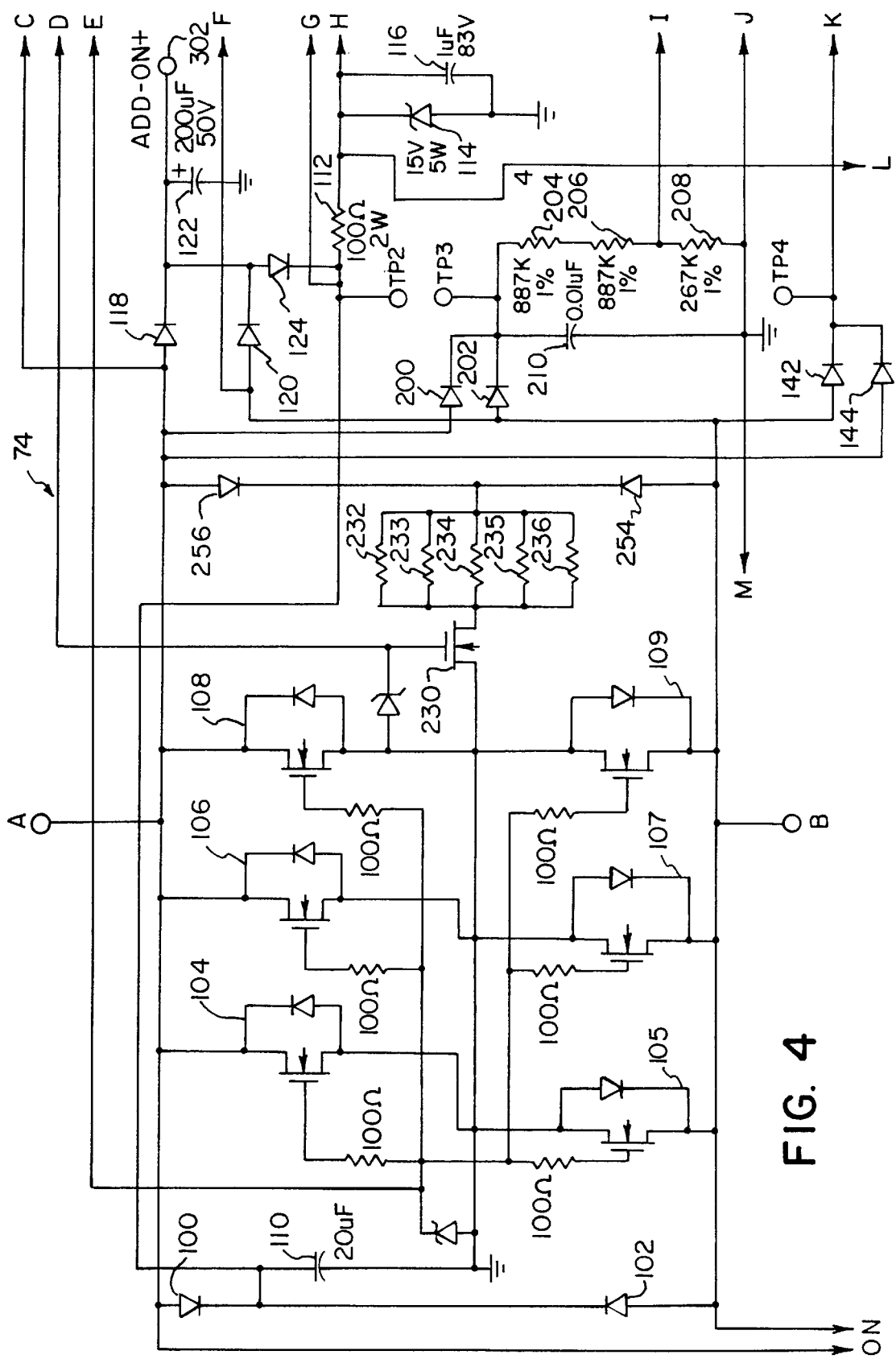
FIGS. 4–7 are detailed schematic circuit diagrams of a voltage and current based control and firing circuit for an isolator surge protector in accordance with the present invention.

Power for the ISP control and firing circuit 74 may be provided in a conventional manner, using, for example, a battery, or the like. However, the ISP control and firing circuit 74 is preferably autonomous and self-powered. Power for autonomous operation of the ISP control and firing circuit 74 is preferably provided from the voltage applied across the ISP 70 prior to initial primary triggering of the main bypass path SCRs 84 and 86. Referring initially to FIG. 4, the voltage $V_{AB}$, across the ISP control and firing circuit 74, is rectified by diodes 100 and 102, and the internal diodes of the auxiliary bypass path MOSFETs 104–109, which will be described in more detail below. The peak value of the voltage $V_{AB}$ across the control and firing circuit 74 is stored by a low inductance capacitor 110, with a capacitance of, e.g., 20 µF. The low internal inductance of this capacitor 110 allows it to capture and store the peak value of $V_{AB}$ even when the voltage across the ISP control and firing circuit rises very rapidly, due to a fast transient event such as a lightning strike. The voltage stored on the low inductance capacitor 110 is fed, via a current limiting resistor 112, to a zener diode 114, connected in parallel with a capacitor 116. The zener diode 114 establishes a positive supply rail voltage at, e.g., 15V, for the ISP control and firing circuit 74.

The voltage $V_{AB}$ across the ISP control and firing circuit 74 is also rectified by diodes 118 and 120, and stored by a large electrolytic capacitor 122, with a capacitance of, e.g., 2000 µF. For relatively slow-rising voltages across the ISP 74, such as occur at normal line frequency, the electrolytic capacitor 122 also captures and stores the peak of the voltage $V_{AB}$ across the ISP control and firing circuit 74. For fast rising voltages, however, the internal inductance of the electrolytic capacitor 122 prevents it from capturing significant voltage. The positive terminal of the electrolytic capacitor 122 is connected via a diode 124 and the current limiting resistor 112 to the positive supply rail. The diode 124 allows energy to be fed from the electrolytic capacitor 122 to the positive supply rail, but does not allow the low-inductance capacitor 110 to feed current into the electrolytic capacitor 122. This ensures that when the low-inductance capacitor 110 is charged by a fast rising voltage, which is too fast to charge the electrolytic capacitor 122, energy stored in the low-inductance capacitor 110 does not subsequently discharge back into the electrolytic capacitor 122. If this occurred, the positive supply rail voltage would collapse, and desired operation of the ISP control and firing circuit 74 could not be obtained.

Because the electrolytic capacitor 122 has much greater capacitance than the low-inductance capacitor 110, the energy stored in the electrolytic capacitor 122 during normal line frequency operation provides a much longer voltage hold-up time of the positive supply rail than would be provided by the low-inductance capacitor 110 itself. Once primary triggering has occurred, the voltage $V_{AB}$ across the ISP control and firing circuit 74 is too low to recharge the storage capacitors 122 and 110. Therefore, the positive supply rail voltage relies totally on the energy initially stored in the storage capacitors 122 and 110. The energy stored in the electrolytic capacitor 122 enables a secondary triggering period to be maintained for an extended period of time.

In accordance with the present invention, the ISP control and firing circuit 74 of the present invention initiates primary triggering of the main bypass path SCRs 84 and 86 whenever the voltage across the ISP reaches a selected primary voltage trigger level. Primary triggering is followed by an extended period of secondary triggering, during which the main bypass path SCRs 84 and 86 are triggered each time the voltage level across the ISP exceeds a secondary voltage trigger level which is much lower than the primary voltage trigger level. Operation of the exemplary ISP control and firing circuit 74 to provide primary and secondary triggering of the main bypass path SCRs 84 and 86 based on the voltage level across the ISP and control and firing circuit 74 will now be described.

Figure 5:
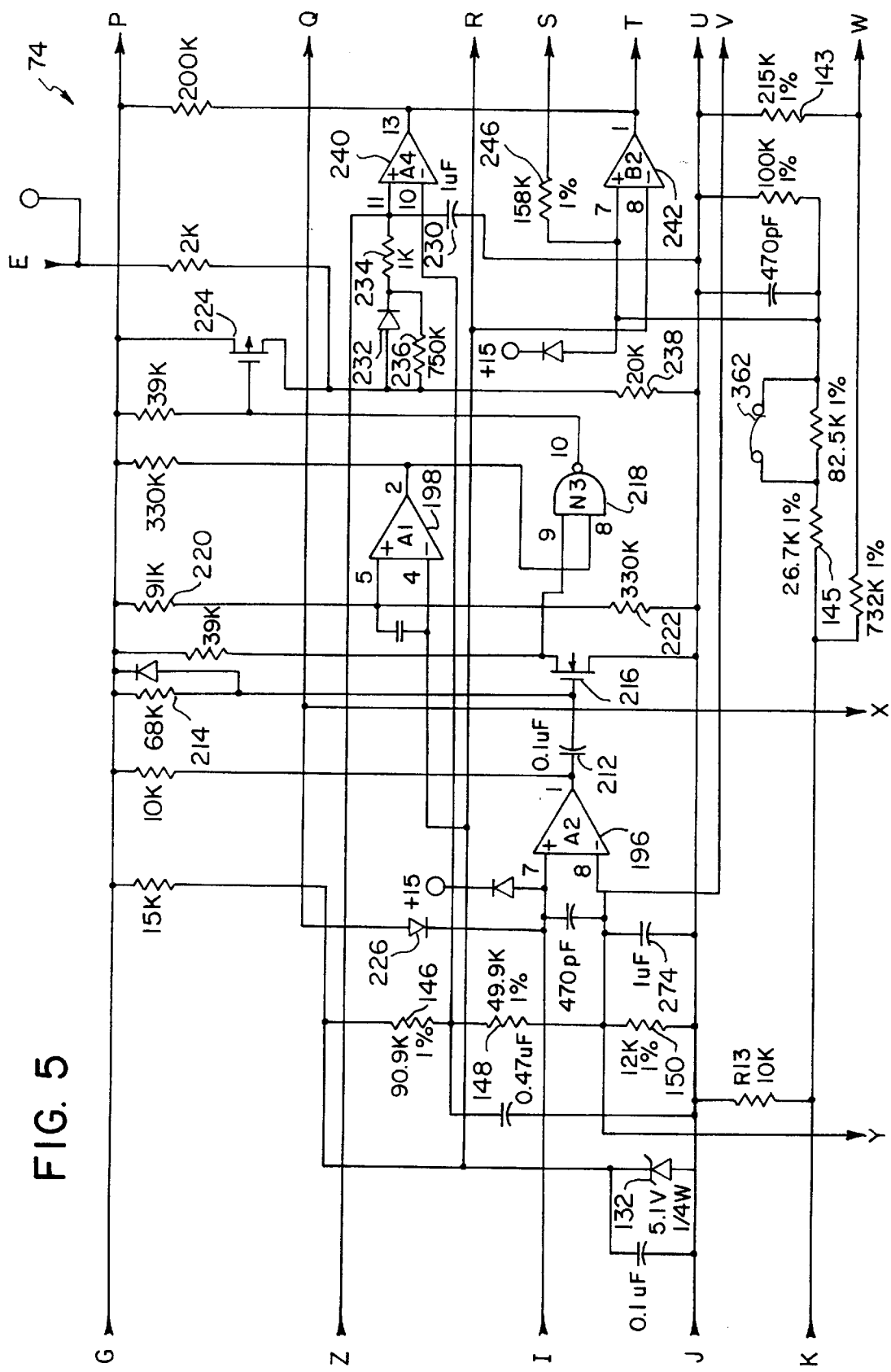
Figure 6:
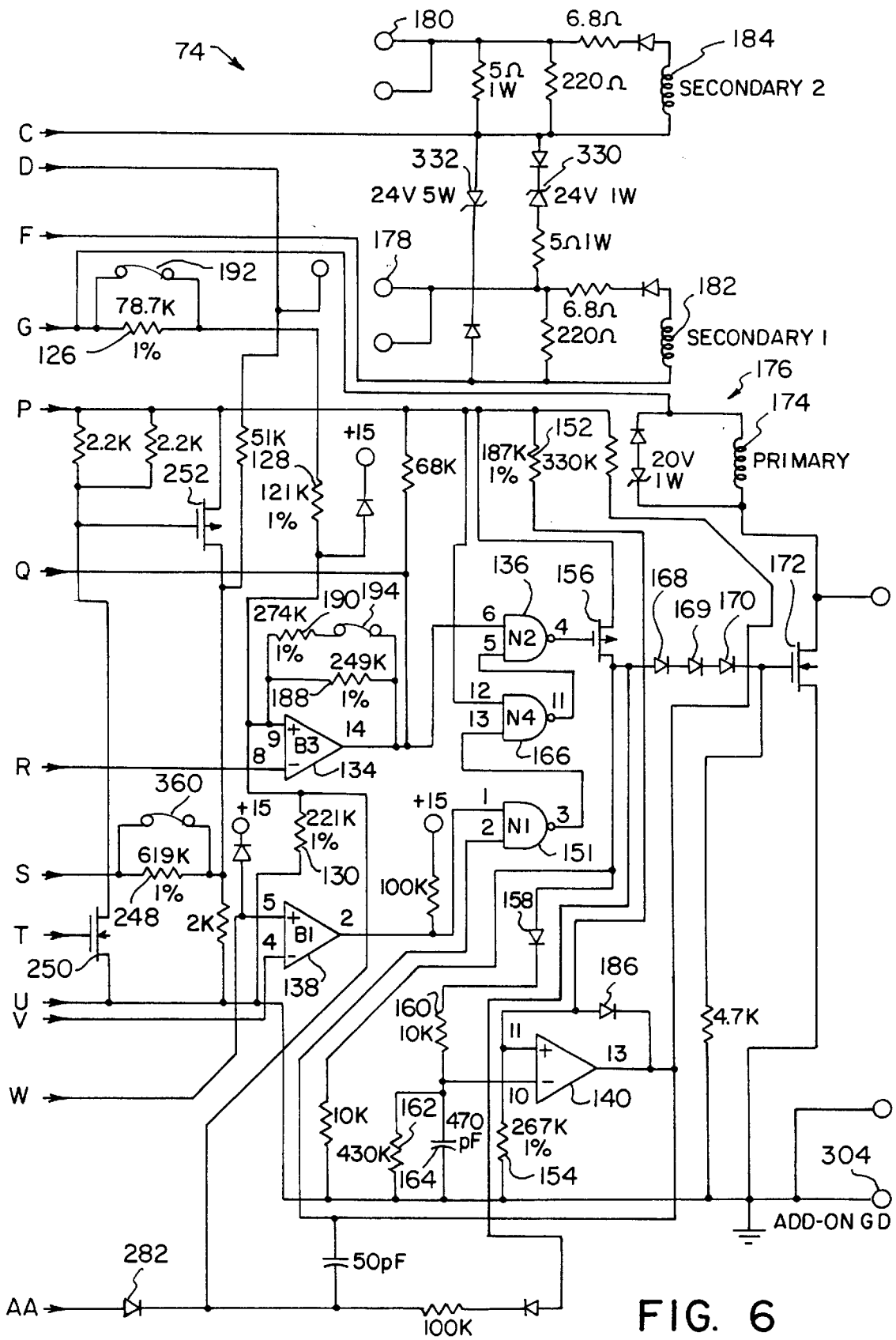

The absolute voltage $V_{AB}$ across the ISP control and firing circuit 74, as captured by the low-inductance capacitor 110, is voltage divided by resistors 126, 128, and 130 (FIG. 6). This fraction of the voltage $V_{AB}$ across the control and firing circuit 74 is compared with a fixed reference voltage developed across zener diode 132 (FIG. 5) at a comparitor 134 (B3). When the voltage across the low inductance capacitor 110 reaches the primary voltage trigger level, a high signal is applied from the output of comparitor 134 (B3) to one of the inputs of a NAND gate 136. The other input to the NAND gate 136 is derived from the outputs of comparitors 138 (B1) and 140 (B4).

Comparitor 138 (B1) compares a fraction of the voltage $V_{AB}$ across the ISP control and firing circuit 74, as rectified by diodes 142 and 144 (FIG. 4) and divided by resistors 143 and 145, with a fixed reference value derived from the zener diode 132 and voltage divider resistors 146, 148, and 150 (FIG. 5). Comparitor 138 (B1) delivers a high output to one of the inputs of a NAND gate 151 when the voltage across the ISP control and firing circuit 74 is greater than the secondary voltage trigger level, e.g., 2.5V, as established by the voltage dividers 146, 148, and 150, the zener diode 132, and the voltage divider resistors 143 and 145. The comparitor 138 (B1) delivers a low output to the NAND gate 151 when the voltage across the ISP control and firing circuit 74 is less than the secondary voltage trigger level.

Comparitor 140 (B4) compares a fraction of the positive supply rail voltage, established by voltage dividing resistors 152 and 154, with a filtered fraction of the voltage at the drain of MOSFET switching device 156, established by diode 158 and voltage dividing resistors 160 and 162 across a capacitor 164. Before the output of comparitor 134 (B3) goes high, the output of NAND gate 136 is high, because the input to NAND gate 136 from the comparitor 134 (B3) is low. When the output of the NAND gate 136 is high, the MOSFET 156 is off, and the input to the comparitor 140 (B4) from the drain of MOSFET 156 is low. Thus, the output of comparitor 140 (B4) is high because the drain voltage of the MOSFET 156 is lower than the fraction of the positive rail voltage at the other input to the comparitor 140 (B4). At this point, just prior to the provision of a primary triggering signal, the output of comparitor 138 (B2) is also high, because the voltage $V_{AB}$ across the ISP control and firing circuit 74 is greater than the low secondary voltage trigger level of, e.g., 2.5V. Thus, at this point, both inputs to NAND gate 151 are high and the output of NAND gate 151 is low. The output of NAND gate 151 is inverted by NAND gate 166, operating as an inverter, to provide a high input to the second input of the NAND gate 136. Thus, when the output of comparitor 134 (B3) goes high, when the voltage across the main bypass path SCRs 84 and 86 exceeds the primary voltage trigger level, both of the inputs to the NAND gate 136 are high, causing the output of NAND gate 136 to go low, and MOSFET 156 to turn on.

When MOSFET 156 turns on, the positive rail voltage is fed via diodes 168, 169 and 170 to the gate of a MOSFET 172, which turns on. This supplies the positive rail voltage to the primary 174 of a transformer 176, thereby feeding firing pulses to the gates of the main bypass path SCRs 84 and 86, which are connected at terminals 178 and 180 to secondaries 182 and 184 of the transformer 176, respectively. Whichever SCR 84 or 86 is forward biased when the firing pulses are received will be triggered into conduction. These firing pulses are the primary triggering signals, which are followed in accordance with the present invention by the secondary triggering period.

When the main bypass path SCRs 84 and 86 fire, the voltage $V_{AB}$ across the ISP control and firing circuit drops below the secondary voltage trigger level of, e.g., 2.5V. This causes the output of the comparitor 138 (B1) to go low, the output of NAND gate 151 to go high, the output of NAND gate 166 to go low, and the output of NAND gate 136 to go high, thereby turning off the MOSFET 156 and terminating the SCR firing pulse. Thus, the SCR firing pulse is terminated automatically as soon as one of the main bypass path SCRs 84 or 86 turns on. By keeping the duration of the SCR firing pulse to the minimum necessary to fire an SCR, the energy consumed from the capacitors 110 and 122 is minimized. This, in turn, maximizes the hold-up time of the positive rail voltage, and thus maximizes the possible duration of the secondary triggering period. Once the secondary triggering period has been initiated, the peak voltage across the main bypass path SCRs 84 and 86 does not rise above the secondary voltage trigger level, e.g., 2.5V. Therefore, the storage capacitors 110 and 122 receive no replenishment of voltage during the secondary triggering period, and the ISP control and firing circuit 74 relies for its operation completely upon the energy initially captured in these capacitors before primary triggering.

Comparitor 140 (B4) provides a "backstop" cutoff of the SCR firing pulse should the voltage $V_{AB}$ across the ISP control and firing circuit not fall below the secondary voltage trigger level within a selected period, e.g., 7 μs, after the primary SCR firing pulse is applied. This condition might occur during low temperature operation, or if the capacitance of the DC blocking capacitor 76 is large, and therefore requires a significant period of time to discharge through the main bypass path SCRs 84 and 86. This backstop firing pulse cutoff function is necessary to avoid saturation of the transformer 176. When the MOSFET 156 turns on, the voltage across capacitor 164 rises until the inverting input of the comparitor 140 (B4) becomes more positive than the non-inverting input of the comparitor 140 (B4). This causes the output of the comparitor 140 (B4) to go low, causing the output of NAND gate 151 to go high, the output of NAND gate 166 to go low, the output of NAND gate 136 to go high, and MOSFETs 156 and 172 to be turned off, thereby terminating the firing pulse. The amount of time that is allowed for the voltage $V_{AB}$ across the ISP control and firing circuit to fall below the low secondary voltage trigger level before the pulse cut-off signal is provided by the comparitor 140 (B4) is established by the value of the capacitor 164 and resistors 160 and 162.

When the output of the comparitor 140 (B4) goes low, the non-inverting input of the comparitor is held to the forward voltage drop across a diode 186. The voltage at the inverting input of the comparitor 140 (B4) now decays, since the MOSFET 156 has been turned off, with a time constant determined by the values of resistor 162 and capacitor 164. The voltage at the inverting input of the comparitor 140 (B4) falls below the forward voltage drop of the diode 186 at the non-inverting input to the comparitor 140 (B4) after, e.g., about 600 μs. At this point, the output of comparitor 140 (B4) becomes high once again, enabling fresh firing pulses to be generated whenever the voltage $V_{AB}$ across the ISP control and firing circuit again exceeds the secondary voltage trigger level, e.g., 2.5V, so long as the output of comparitor 134 (B3) also remains high.

Comparitor 134 (B3) is provided with hysteresis which determines the duration of the secondary triggering period. This hysteresis is provided by resistors 188 and 190. Once the primary voltage trigger level across the low inductance capacitor 110 is reached, driving the output of the comparitor 134 (B3) high, the output remains high until the voltage across the capacitor 110 decays to a second, lower level. The voltage level across the capacitor 110 at which the output of comparitor 134 (B3) goes high, and the voltage level at which it again goes low, may be adjusted using links 192 (link 1) and/or 194 (link 4) to bypass and/or include the resistors 126 and 190, respectively, in the ISP control and firing circuit 74. For example, if link 192 (link 1) is taken out, and link 194 (link 4) is left in, the primary voltage trigger level which must be reached for the output of comparitor 134 (B3) to go high is approximately 19.5V (this corresponds to an approximate initial voltage across capacitor 110 of 18.3V, the difference of 1.2V between the primary voltage trigger level and the voltage across capacitor 110 is due to the voltage drop across the rectifying diodes 100 and 102 and the internal diodes of the auxiliary bypass path MOSFETS 104–109). In this state, the voltage level across the capacitor 110 must be below approximately 8V for the output of comparitor 134 (B3) to go low. This provides an approximate secondary triggering period duration of 11 seconds. If link 192 (link 1) is left in, and link 194 (link 4) is taken out, the primary trigger voltage level is approximately 12.0V, corresponding to an initial voltage across the capacitor 110 of 10.8V. The voltage level across the capacitor 110 must still go below approximately 8 volts for the output of comparitor 134 (B3) to go low. This case provides an approximate secondary triggering period duration of 4.5 seconds.

Initial primary triggering of the main bypass path SCRs 84 and 86 occurs at the selected primary voltage trigger level, i.e., the selected value of the voltage $V_{AB}$ across the ISP control and firing circuit 74, at which the output of comparitor 134 (B3) goes high. So long as the output of comparitor 134 (B3) remains high, the secondary triggering period remains in effect. Throughout the secondary triggering period, each time the voltage $V_{AB}$ across the ISP control and firing circuit 74 exceeds the secondary voltage trigger level, e.g., 2.5V, the output of comparitor 138 (B1) goes high, causing the output of NAND gate 151 to go low, the output of NAND gate 166 to go high, the output of NAND gate 136 to go low, and MOSFETs 156 and 172 to be turned on to deliver a new firing pulse to the SCRs 84 and 86 through the transformer 176.

At the end of the secondary triggering period, the output of comparitor 134 (B3) goes low. If an external DC voltage is applied across the terminals 80 and 82 of the ISP 70, a DC component of current may have built up in the main bypass path SCRs 84 and 86 during the secondary triggering period. Thus, one of the SCRs 84 or 86 may have become stuck in conduction, perhaps with a unidirectional pulsating current which is the sum of the DC current and the normal AC current passing through it. If an SCR 84 or 86 is stuck in conduction at the end of the secondary triggering period, the auxiliary bypass path MOSFETs 104–109 are turned on for, e.g., about 2 milliseconds, to divert current from the main bypass path SCRs 84 and 86 through the ISP control and firing circuit 74, to commutate the SCRs 84 and 86 off.

In the exemplary ISP control and firing circuit 74 being described, comparitors 196 (A2) and 198 (A1) (FIG. 5) control the provision of an auxiliary bypass path switching signal to turn on the auxiliary bypass path MOSFETs 104–109. (Although six auxiliary bypass path MOSFETs 104–109 are shown, more MOSFETs may be employed in parallel to increase the DC current turn-off capability of the ISP auxiliary bypass path.) The non-inverting input to the comparitor 196 (A2) is provided with a portion of the voltage $V_{AB}$ across the ISP control and firing circuit 74 as rectified by diodes 200 and 202 and divided across resistors 204, 206, and 208 (FIG. 4). A reference voltage level is applied to the inverting input of comparitor 196 (A2). This reference voltage level is established by zener diode 132 and voltage dividing resistors 146, 148, and 150. When the voltage $V_{AB}$ across the control and firing circuit 74 drops below, e.g., 3.5V, the output of the comparitor 196 (A2) is able to go low. A capacitor 210 connected in parallel with the voltage divider of resistors 204, 206 and 208 provides a discharge time of about, e.g., 20 ms, thereby smoothing the input to the non-inverting input of comparitor 196 (A2) relative to the actual instantaneous value of the voltage $V_{AB}$ across the ISP control and firing circuit 74. This prevents the output of comparitor 196 (A2) from going low and turning on the auxiliary bypass path MOSFETs 104–109 during normal blocking operation of the ISP 70. An additional input to the non-inverting input of comparitor 196 (A2) is delivered via a diode 226 from the output of comparitor 134 (B3). This input ensures that when the output of comparitor 134 (B3) is high, i.e, during the secondary triggering period, the non-inverting input to comparitor 196 (A2) is more positive than the inverting input. This keeps the output of comparitor 196 (A2) high, preventing the auxiliary bypass path MOSFETs 104–109 from being turned on during the secondary triggering period. When the output of comparitor 196 (A2) goes low, a differentiating circuit formed by capacitor 212 and resistor 214 turns off the MOSFET 216 for a period of about, e.g., 2 ms. When MOSFET 216 is turned off, one of the inputs to NAND gate 218 becomes high.

The second input to the NAND gate 218 is connected to the output of undervoltage sensing comparitor 198 (A1). The output of undervoltage sensing comparitor 198 (A1) is high so long as the positive rail voltage is greater than an undervoltage trip level of, e.g., about 6.5V, defined by voltage dividing resistors 220 and 222 and zener diode 132. Thus, the output of NAND gate 218 goes low for about, e.g., 2 ms, whenever the output of comparitor 196 (A2) goes low, provided that the positive rail voltage is greater than the undervoltage level.

At the end of the secondary triggering period, the output of comparitor 134 (B3) goes low. If the voltage $V_{AB}$ across the ISP control and firing circuit 74, rectified by diodes 200 and 202, is lower than about, e.g., 3.5V, and remains lower than this for longer than the, e.g., 20 ms, delay time of capacitor 210 and voltage dividing resistors 204, 206 and 208, then the output of comparitor 196 (A2) goes low. This causes the output of NAND gate 218 to go low for a period of about, e.g., 2 ms, provided that the positive rail voltage is greater than the undervoltage level, i.e., the output of comparitor 198 (A1) is high. The output of NAND gate 218 going low causes MOSFET 224 to turn on to deliver a positive auxiliary bypass path switching signal to the gates of the auxiliary bypass path MOSFETs 104–109, thereby turning on the MOSFETs 104–109 for a period of about, e.g., 2 ms. If the voltage $V_{AB}$ across the ISP control and firing circuit 74 rises above, e.g., 3.5V within the above, e.g., 20 ms delay period, indicating that a main bypass path SCR is not stuck in conduction, then the output of comparitor 196 (A2) stays high, and the auxiliary bypass path MOSFETs 104–109 remain off.

During the secondary triggering period, DC current is allowed to flow, along with any AC current, through the main bypass path 72. Thus, DC energy may become stored in the inductances associated with the system to which the ISP 70 is attached, as well as in the internal inductances of the ISP itself. For example, DC energy may become stored in the windings of a power transformer and the transmission system to which the ISP is connected. This stored DC energy will cause the voltage across the ISP to rise once the main bypass path SCRs 84 and 86 have been turned off, and could cause a false retriggering of the main bypass path SCRs 84 and 86 at the primary voltage trigger level. To dissipate this stored system energy, the ISP control and firing circuit 74 preferably initiates a voltage clamping period, following the end of the auxiliary bypass period, during which this inductive energy is dissipated.

For the exemplary ISP control and firing circuit 74 being described, voltage clamping is provided by turning on voltage clamping MOSFET 230 whenever the voltage $V_{AB}$ across the ISP control and firing circuit 74 attempts to rise above a preset voltage clamp voltage level, which is less than the primary voltage trigger level, during the voltage clamping period. Turning on MOSFET 230 shunts the stored system energy into resistors 232–236, wherein the inductive energy is dissipated.

At the end of the auxiliary bypass period, capacitor 230 (FIG. 5) has been charged to essentially the positive rail voltage via MOSFET 224, diode 232, and resistor 234. The discharge time constant of capacitor 230, set by resistors 234, 236 and 238, keeps the non-inverting input of comparitor 240 (A4) positive with respect to the inverting input of comparitor 240 (A4), which is set by zener diode 132 and voltage divider resistors 146, 148 and 150, for about, e.g., 1 second. During this period, the output of comparitor 240 (A4) is high, if the output of comparitor 242 (B2) is also high, and voltage clamping is free to occur, should the voltage $V_{AB}$ across the ISP control and firing circuit 74 rise above a set voltage clamping voltage level.

Comparitor 242 (B2) compares a portion of the voltage $V_{AB}$ across the ISP control and firing circuit 74, as rectified by diodes 142 and 144, with a fixed reference value, i.e., the voltage across zener diode 132. The output of comparitor 242 (B2) goes high when the voltage $V_{AB}$ across the ISP control and firing circuit 74 instantaneously exceeds a first set voltage clamping voltage level, and low again when $V_{AB}$ instantaneously becomes lower than a second, lower, set value. Hysteresis between these high and low voltage clamp voltage levels is provided by resistors 246 and 248. The output of comparitor 240 (A4) is connected to the output of comparitor 242 (B3). only when the inputs to both of these comparitors 240 (A4) and 242 (B2) simultaneously demand a high combined output does the actual output of the comparitors 240 (A4) and 242 (B2) go high.

When the common output of comparitors 240 (A4) and 242 (B2) is high, MOSFETs 250 and 252 are turned on, sending a positive gate drive voltage to the voltage clamping MOSFET 230, turning it on. When MOSFET 230 turns on, resistors 232–236 are connected across the terminals of the ISP control and firing circuit 74, via diode 254 and the internal diodes of auxiliary bypass MOSFETS 104, 106, and 108, or diode 256, and the internal diodes of auxiliary bypass path MOSFETs 105, 107, and 109. Resistors 232–236 are preferably positive temperature coefficient type resistors. The resistors 232–236 dissipate the inductive energy from the system. When the voltage across the ISP control and firing circuit 74 drops below the lower set value, the output of comparitor 242 (B2) goes low and MOSFET 230 is turned off again. If the voltage across the control and firing circuit 74 rises to the voltage clamp voltage level once more, due to the continued presence of DC energy stored in system inductances, the MOSFET 230 will once again be turned on to connect the resistors 232–236 across the terminals of the control and firing circuit 74. This cycle is repeated for the duration of the voltage clamping period, i.e., until the output of comparitor 240 (A4) goes low, to allow the DC energy stored in system inductances to be dissipated through the resistors 232–236 and to prevent the ISP 70 from retriggering at the primary voltage trigger level due to a voltage rise across the DC blocking capacitor 76 caused by this inductive energy.

At the end of the voltage clamping period, the ISP control and firing circuit 74 becomes dormant, allowing the voltage across the ISP 70 to again assume a level that results solely from the interaction of the externally applied voltage and current with the passive impedance of the ISP 70. A new primary triggering event is initiated if the voltage across the ISP 70 again reaches the absolute primary voltage trigger level.

As was discussed previously, it is possible for the amplitude of the AC current in the DC blocking capacitor 76 to exceed the rated value of the capacitor even though the peak voltage across the DC blocking capacitor 76 remains less than the absolute primary voltage trigger level. This is most likely to occur if the DC bias voltage applied to the ISP 70 is low. In accordance with the present invention, the DC blocking capacitor 76 is protected from excessive currents by initiating primary triggering of the main bypass path SCRs 84 and 86, followed by a period of secondary triggering, should the capacitor current exceed a predetermined primary current trigger level. In accordance with the present invention, current dependent primary triggering is independent of the absolute value of the voltage $V_{AB}$ across the main bypass path SCRs 84 and 86. Diversion of the capacitor current into the SCRs 84 and 86 during the secondary triggering period reduces the net rms capacitor current to a safe value.

Primary triggering of the main bypass path SCRs 84 and 86 based on the current level in the DC blocking capacitor 76 may be achieved by monitoring the current in the DC blocking capacitor 76 using a conventional current transformer connected in series with the DC blocking capacitor 76, and firing the main bypass path SCRs 84 and 85 when the measured current exceeds a primary current trigger level. For different ISP models, that may use different numbers of parallel-connected DC blocking capacitors of the same type, a single current transformer in series with one capacitor would suffice to protect a group of parallel capacitors, on the basis that all capacitor currents would be nominally equal. This arrangement would avoid the need for adjustments to the current dependent triggering circuit for different numbers of capacitor components.

Figure 7:
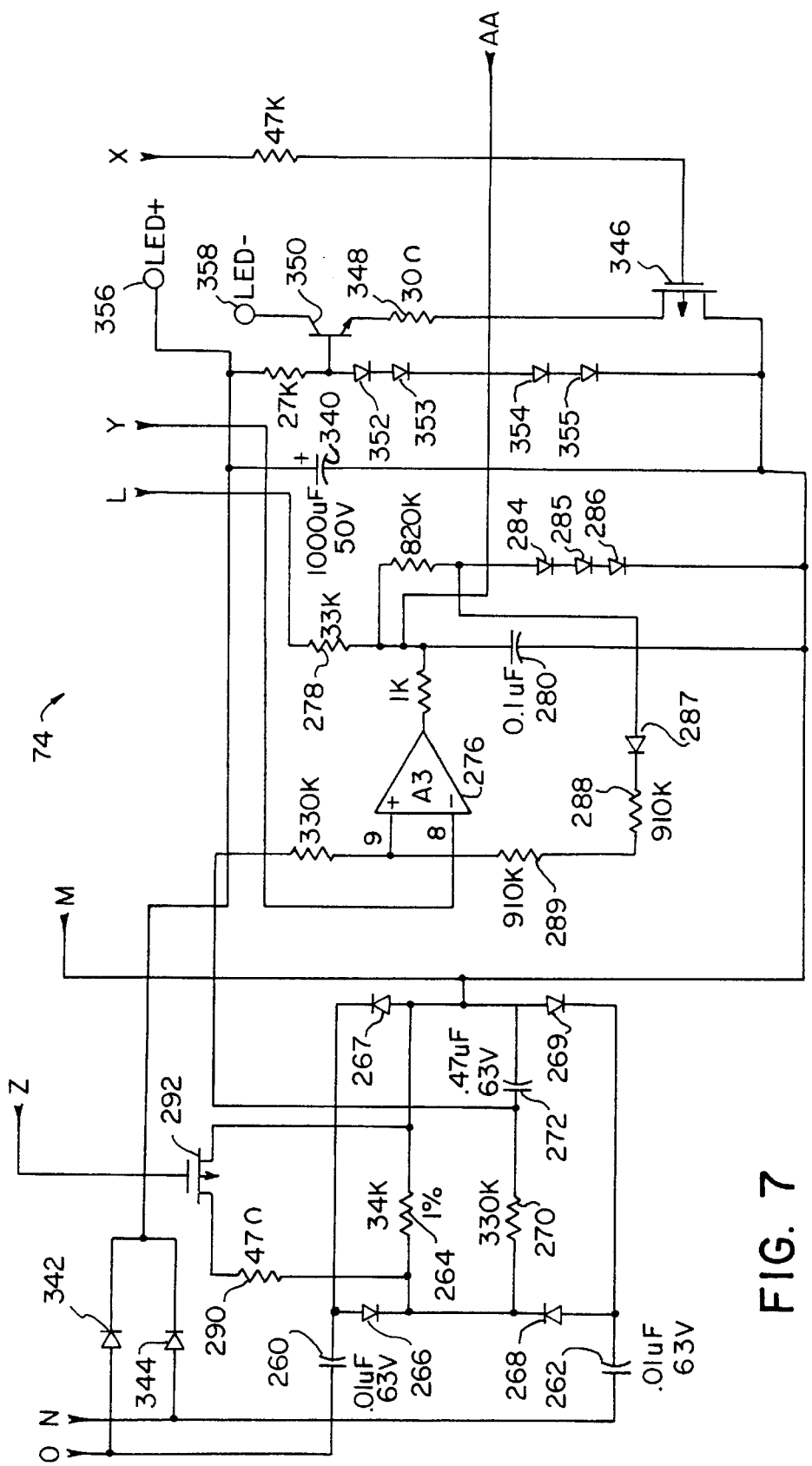

The preferred ISP control and firing circuit 74 being described uses an alternative method of sensing the current in the DC blocking capacitor 76 which avoids the use of a current transformer. With reference particularly to FIG. 7, small capacitors 260 and 262 (e.g., of 0.01 $\mu$F each) are connected to the A and B nodes of the ISP 70, i.e., to the terminals of the DC blocking capacitor 76. The resistance of a resistor 264 is much lower than the reactance, at line frequency, of the capacitors 260 and 262. Thus, the current that flows through the capacitors 260 and 262 is essentially a small known fraction of the current that flows through the DC blocking capacitor 76. This fraction is determined by the ratio of the capacitance of the capacitors 260 and 262 to the capacitance of the DC blocking capacitor 76. Thus, the average full-wave rectified voltage, rectified by diodes 266–269, across the resistor 264, is substantially proportional to the average current that flows through the DC blocking capacitor 76. As the value of the DC blocking capacitance is changed for different ISPs, the ratio between the DC blocking capacitance and the capacitance of the capacitors 260 and 262 will change proportionately for fixed values of the capacitance of capacitors 260 and 262. Thus, a given average voltage across the resistor 264 will correspond to a current in the DC blocking capacitor that is proportional to the value of the DC blocking capacitor's capacitance. In general, the same maximum value of average voltage across the resistor 264 will represent the maximum allowed capacitor current, regardless of the value of the DC blocking capacitor's capacitance, assuming that the rms current capability of the DC blocking capacitor 76 is proportional to its capacitance value. Thus, no adjustment to the current dependent triggering circuit may be necessary for different ISP models that contain different numbers of similar capacitor components.

The full wave rectified voltage across resistor 264 is smoothed by resistor 270 and capacitor 272 (C13). An essentially smooth DC voltage representing the current in the DC blocking capacitor 76 is thus developed across the capacitor 272 (C13). This voltage is compared with a fixed reference value, developed across resistor 150 and capacitor 274 (FIG. 5) by comparitor 276 (A3). When the AC current in the DC blocking capacitor 76 exceeds the set value, the output of comparitor 276 (A3) goes high, with a total delay time determined by both resistor 270 and capacitor 272 (C3) and resistor 278 and capacitor 280 (C14). The output of comparitor 276 (A3) is fed, via diode 282 (FIG. 6) to the non-inverting input terminal of comparitor 134 (B3). Thus, the output of comparitor 134 (B3) is driven high, initiating an SCR firing pulse, and starting the secondary triggering period, when the current in the DC blocking capacitor 76 exceeds the primary current trigger level.

The average voltage across the resistor 264 is approximately proportional to the resistance value of the resistor 264. Thus, the peak value of AC current through the DC blocking capacitor 76 that causes primary triggering can be adjusted by adjusting the resistance value of resistor 264. In the exemplary embodiment of the control and firing circuit 74 being described, the output of comparitor 276 (A3) goes high when the voltage across the capacitor 272 (C3) reaches approximately 0.4V. Hysteresis, provided by diodes 284–287, and resistors 288 and 289, keeps the output of comparitor 276 (A3) high until the voltage across the capacitor 272 (C3) falls back to about 0.28V. (In principle, resistors 288 and 289 can be a single resistor; however, small surface-mount resistors above 1 MΩ are typically not readily available.)

A secondary triggering period, as described above, is initiated following primary triggering at the primary current trigger level. During the secondary triggering period, the main bypass path SCRs 84 and 85 are fired each time the voltage level across the ISP 70 exceeds the low secondary voltage trigger level. Thus, the current in the DC blocking capacitor 76 is shunted through the main bypass path 72 during the secondary triggering period, thereby reducing the average current in the capacitor to a safe level. The secondary triggering period continues until the voltage across the low-inductance storage capacitor 110 falls to a selected level, e.g., 8V. At the end of the secondary triggering period, the operation of the ISP control and firing circuit 74 sequences through the auxiliary bypass and voltage clamping modes, as necessary, in the same manner as previously described.

A low value resistor 290 and a MOSFET 292 are preferably connected across the resistor 264. The gate of the MOSFET 292 is connected to capacitor 230 (FIG. 5). Most of the time, the voltage across capacitor 230 is zero, and MOSFET 292 is off. However, during the voltage clamping period, the voltage appearing across capacitor 230 turns MOSFET 292 on, thereby shunting the low value resistor 290 across resistor 264. This significantly reduces the input voltage to the non-inverting input of the comparitor 276 (A3), thereby preventing its output from going high. The output of the comparitor 276 (A3) could otherwise go high if significant ripple current were to flow in the DC blocking capacitor 76 during the voltage clamping period. This could drive the output of comparitor 134 (B3) high, via diode 282, and re-fire the main bypass path SCRs 84 and 86 during the voltage clamping period, which must be avoided.

Figure 8:
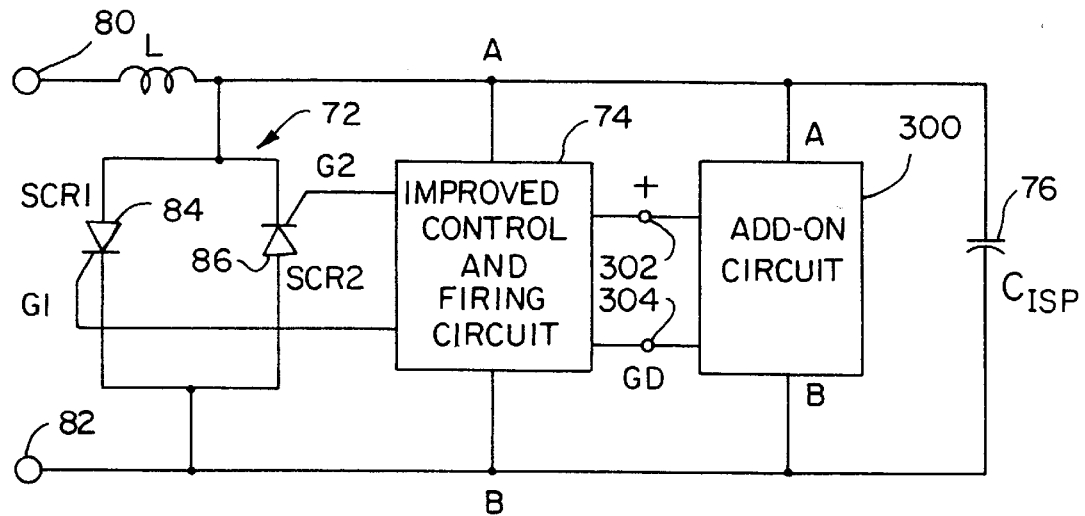
FIG. 8 is a schematic circuit diagram of an isolator surge protector in accordance with the present invention including a voltage boosting add-on circuit for providing a boosted voltage level to the isolator surge protector control and firing circuit for low voltage operation thereof.

The foregoing description of the operation of the exemplary ISP control and firing circuit 74 for providing triggering of the main bypass path SCRs 84 and 86 when the current level in the DC bypass capacitor 76 exceeds the selected primary current trigger level assumes that the peak voltage level at which current dependent primary triggering occurs provides a sufficient positive rail voltage, via diodes 100 and 102, for the ISP control and firing circuit 74 to function properly in the required manner. In some situations, however, the peak AC current through the DC blocking capacitor 76 at which primary triggering is required will not produce a peak voltage across the DC blocking capacitor 76 that is sufficient to provide the required initial positive rail voltage. A voltage boosting add-on circuit 300 may preferably be connected in the ISP circuit 70, as illustrated in FIG. 8, to boost the positive rail voltage to the required level under such low voltage AC current-dependent primary triggering conditions. The voltage boosting add-on circuit 300 is connected to the A and B nodes of the ISP 70, i.e., in parallel with the DC blocking capacitor 76. The add-on circuit 300 is also connected at positive 302 and ground 304 terminals across the electrolytic storage capacitor 122 of the ISP control and firing circuit 74 (see FIG. 4 and FIG. 6).

A preferred circuit for implementing the voltage boosting add-on circuit 300 is described with reference to FIG. 9. (Other conventional voltage boosting circuits may also be used.) The AC voltage across the A and B terminals of the add-on circuit 300 is applied across the primary winding 304 of a transformer 306. The DC component of the voltage across the A and B terminals is blocked by capacitors 308 and 310 and diodes 312 and 314. The output voltage appearing on the secondary winding 316 of the transformer 306 is rectified by diodes 318 and 320, and applied across the electrolytic storage capacitor 122 in the ISP control and firing circuit 74 via add-on circuit terminals 302 and 304. The turns ratio and internal impedance of the transformer 316 are selected, for example, such that a peak value of voltage across the A and B terminals of the add-on circuit at the primary current trigger level of, e.g., 6.8V, delivers a DC voltage across the electrolytic storage capacitor 122 of about, e.g., 9V. This voltage level is sufficient to allow the ISP control and firing circuit 74 to perform its primary triggering function.

The diodes 320–325 in the voltage boosting add-on circuit 300 provide a blocking threshold of about 2V. Below this threshold, essentially no voltage is applied to the primary winding 304 of the add-on circuit transformer 306. This blocking threshold is necessary to keep the output of the under voltage comparitor 198 (A1) (FIG. 5) low at low AC voltage levels. The blocking diodes 320–325 thus eliminate the possibility of the auxiliary bypass path MOSFETs 104–109 being turned on repeatedly at low AC voltage levels, which could occur if the output of the undervoltage comparitor 198 (A1) is high.

When a fast rising voltage, such as is caused by a lightning strike, appears across the ISP input terminals 80 and 82, the mechanism that normally initiates triggering of the main bypass path SCRs 84 and 86, via the voltage across the capacitor 110, the comparitor 134 (B3), MOSFETs 156 and 172, and transformer 176, will not react quickly enough to fire the main bypass path SCRs 84 and 86. Under such conditions, a dangerously high voltage level could appear across the ISP 70. An auxiliary mechanism for triggering the main bypass path SCRs 84 and 85 under such fast rising voltage conditions, is, therefore, preferably employed.

A preferred auxiliary triggering mechanism includes zener diodes 330 and 332 (FIG. 6) which are connected between the anodes and gates of the main bypass path SCRs 84 and 86, respectively. When the voltage level across the ISP rises to a level such that the breakover voltage level of one of the zener diodes 330 or 332 is exceeded, SCR 84 or 86 is triggered into conduction. This SCR firing mechanism is virtually instantaneous, once the breakover voltage of the zener diode 330 or 332 is exceeded, and ensures that the peak voltage across the main bypass path SCRs 84 and 86 is limited, even under severe lightning strike conditions.

The breakover voltage of the zener diodes 330 and 332 is selected such that auxiliary triggering via the zener diodes occurs at a voltage level across the ISP 70 which is higher than the primary voltage trigger level. For example, the nominal breakover voltage of the zener diodes 330 and 332 may be selected to provide a 24V trigger level for an ISP having a primary voltage trigger level of approximately 19.5 volts. Thus, the zener diodes 330 and 332 do not conduct, and play no part in firing the main bypass path SCRs 84 and 86, for normal line frequency voltage or current dependent triggering.

In accordance with the present invention, a warning indication is preferably provided whenever primary triggering occurs. This warning indication may be visual, audible, or in any other form desired. A flashing visual indication is preferred. Such an indication provides a visual warning that the voltage and/or current levels applied to the ISP 70 are beyond the normal operating range, and that triggering is occurring.

In the exemplary ISP control and firing circuit 74 being described, when initial primary triggering occurs, the capacitor 340 (FIG. 7) is charged to the voltage level $V_{AB}$ across the ISP control and firing circuit 74, via rectifying diodes 342 and 344. When the output of comparitor 134 (B3) goes high, to initiate primary triggering and start the secondary triggering period, MOSFET 346 is driven on, which connects the emitter resistor 348 of transistor 350 to ground. Diodes 352–355 develop a voltage of about 2V at the base of the transistor 350. This sets up an approximately constant current of 40 mA through both the transistor 350 and an LED which may be connected between the terminals 356 and 358, thereby discharging capacitor 340. This continues until the voltage on the capacitor 340 falls below a level that can sustain the LED current. Thus, the LED flashes on for a short period each time initial primary triggering occurs. This circuit allows the LED current to be held approximately constant, regardless of the voltage initially captured on the capacitor 340, thereby minimizing the size of the capacitor 340, and preventing overdriving of the LED.

In the exemplary ISP control and firing circuit 74 illustrated in FIGS. 4–7, the links 192 (link 1), 360 (link 2), 362 (link 3), and 194 (link 4) may be taken in or out, and combined with the voltage boosting add-on circuit 300 to establish various operating options with respect to the primary voltage trigger level, the peak AC voltage level at which current dependent primary triggering may occur, and the average clamping voltage. These options are summarized in Table 1.

TABLE 1

Exemplary Operating Options for ISP Control and Firing Circuit

| Option | Primary Voltage Trigger Level | VAC Peak Trigger Level | Avg. Clamp Voltage | Links 1 | 2 | 3 | 4 | Add-On Circuit |
|---|---|---|---|---|---|---|---|---|
| 1 | 12 V | 11.5 V | 8.5 V | IN | IN | IN | OUT | NO |
| 2 | 19.5 V | 11.5 V | 13 V | OUT | OUT | OUT | IN | NO |
| 3 | 19.5 v | 6.8 V | 13 V | OUT | OUT | OUT | IN | YES |

Figure 10:
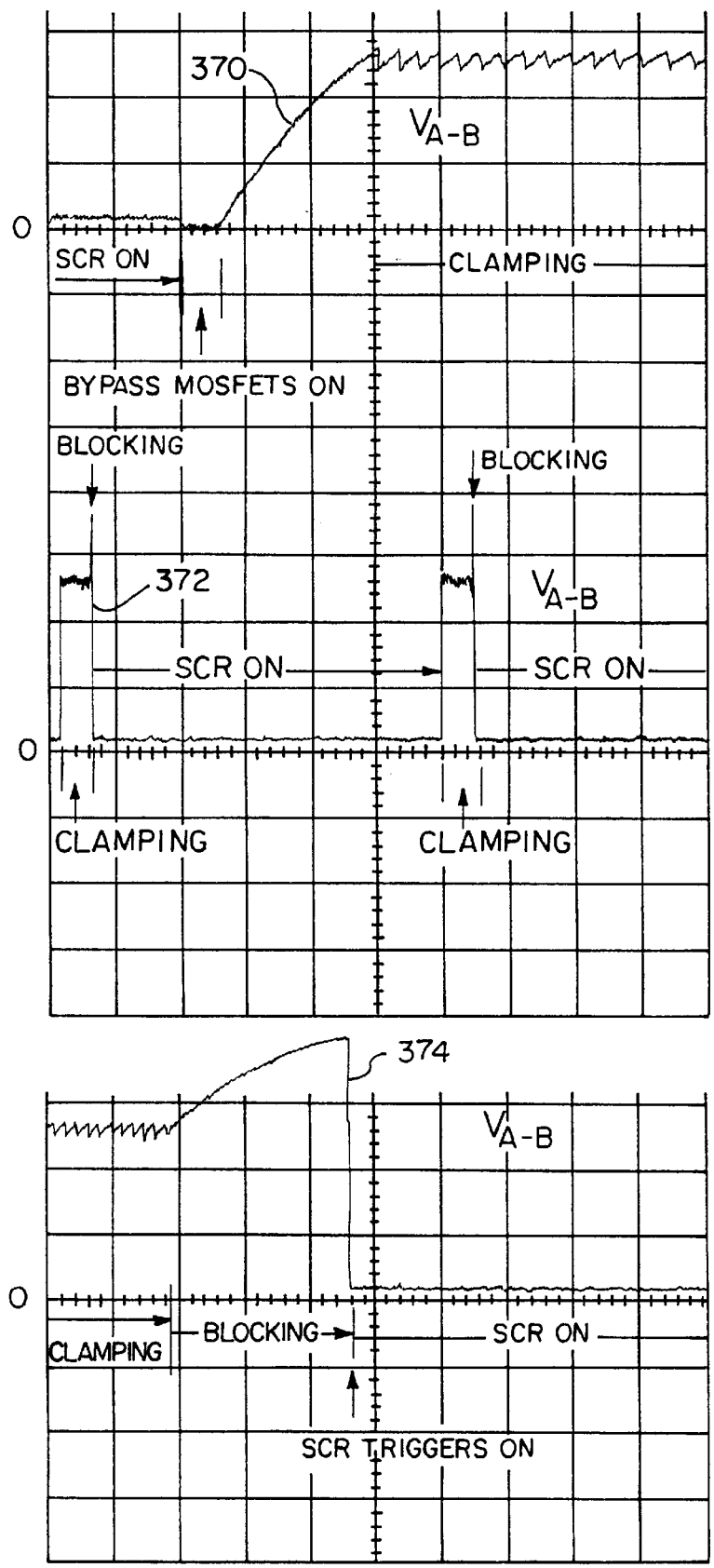
FIGS. 10–12 are waveform diagrams illustrating the operation of an isolator surge protector in accordance with the present invention under abnormally high DC voltage and zero AC voltage operating conditions.
Figure 11:
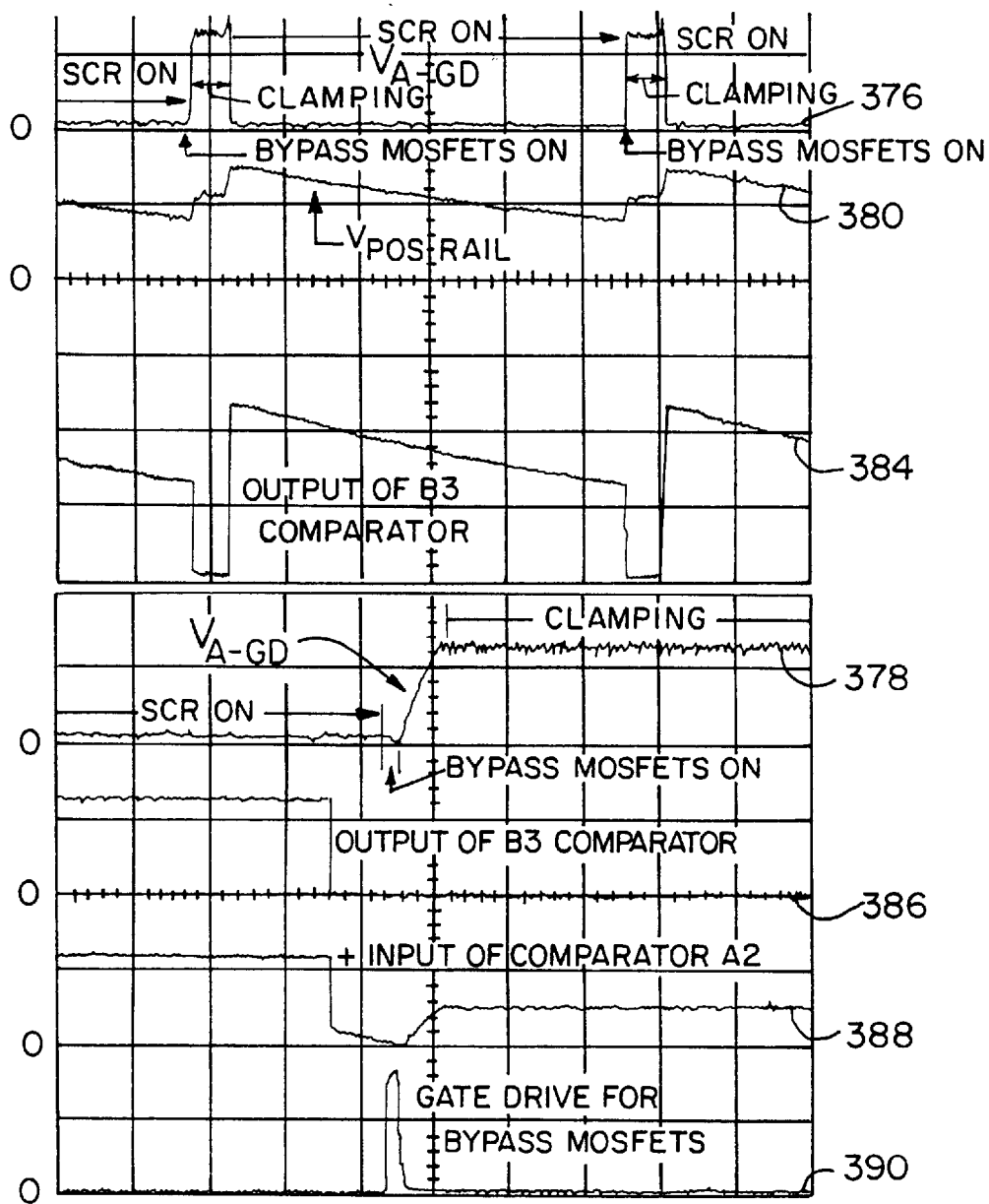
Figure 12:
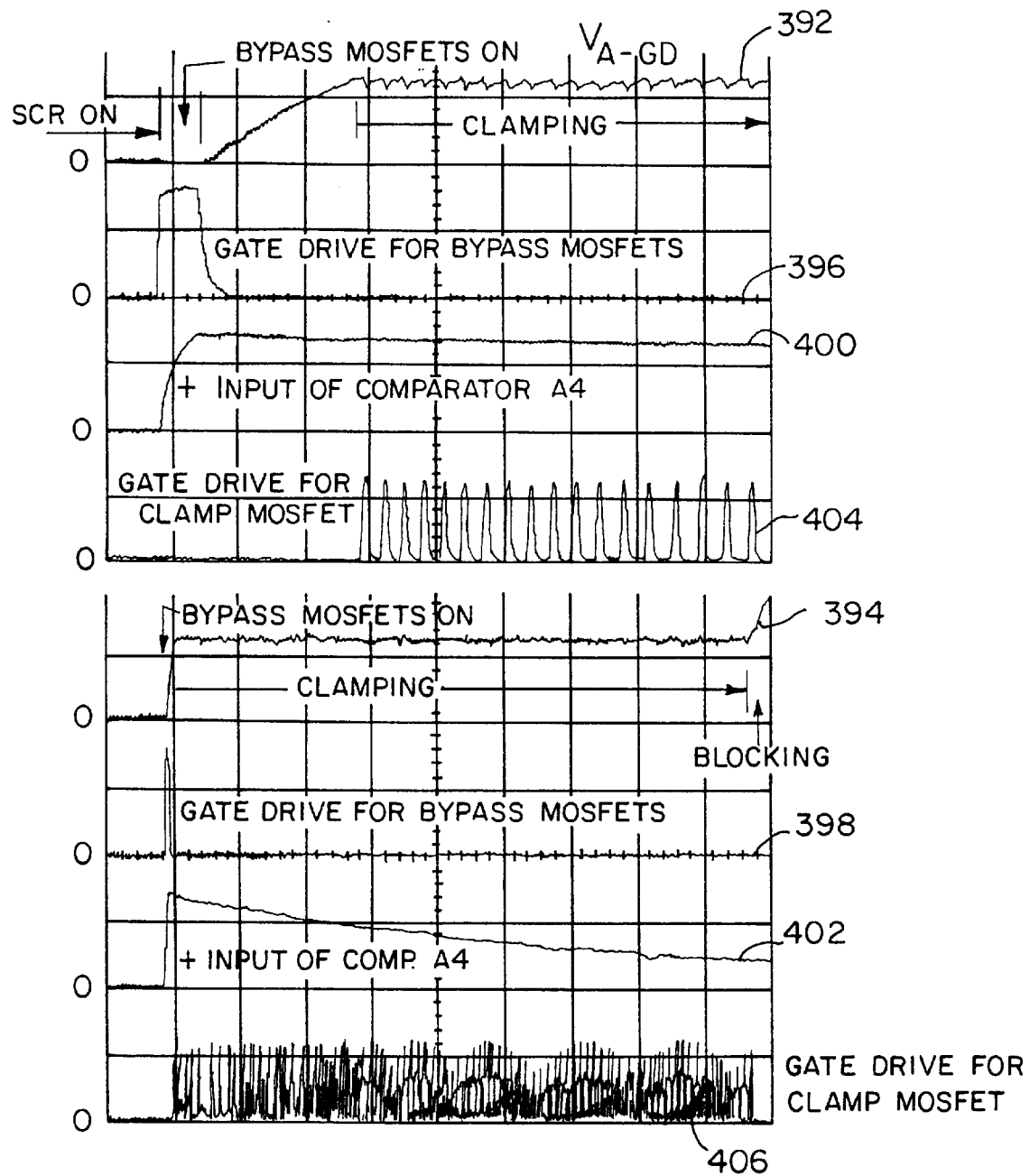

FIGS. 10–12 show waveforms which illustrate the operation of the exemplary ISP control and firing circuit 74 under test conditions with a primary voltage trigger level of 19.5V (option 2). A test DC voltage in excess of the 19.5V primary voltage trigger level was applied to the input terminals 80 and 82 of the ISP 70. No AC current was applied to the ISP 70 for this test. The voltage $V_{AB}$ across the ISP control and firing circuit 74 is illustrated by the waveforms 370, 372, and 374 in FIG. 10. These waveforms illustrate the basic operating sequence of an ISP in accordance with the present invention. Waveform 372 illustrates a complete operating cycle. When the voltage across the ISP 70 reaches the primary voltage trigger level, the ISP control and firing circuit 74 turns on the main bypass path SCRs 84 and 86, which causes the voltage across the ISP to drop. An extended secondary triggering period of, e.g., 11 seconds, follows, during which the voltage across the ISP is limited to the secondary voltage trigger level. After the secondary triggering period has ended, the main bypass path SCRs 84 and 86 are turned off. As illustrated by waveform 370, the ISP control and firing circuit 74 turns on the auxiliary bypass path MOSFETs 104–109 for, e.g., about 2 ms, which causes the voltage $V_{AB}$ to fall almost to zero, thereby commutating the main bypass path SCRs 84 and 86 off. After the auxiliary bypass period, with the main bypass path SCRs 84 and 86 turned off, the voltage across the ISP begins to rise. When the voltage reaches the voltage clamp voltage level, the ISP control and firing circuit 74 initiates the voltage clamping period for, e.g., about 1 second. As described previously, during the voltage clamping period, any voltage rise beyond a certain voltage clamp voltage level is prevented, and energy which has become stored in system inductances during the period when the main bypass path SCRs 84 and 86 were in conduction is dissipated. During the voltage clamping period, the voltage $V_{AB}$ oscillates between the high and low voltage clamping voltage levels. Following the voltage clamping period, the ISP control and firing circuit returns to its dormant state and, with the main bypass path SCRs 84 and 86 turned off, the voltage across the ISP begins to rise from the voltage clamping level toward the primary voltage trigger level, as illustrated by waveform 374. Once the voltage across the ISP 70 reaches the primary voltage trigger level, the main bypass path SCRs 84 and 86 are turned on once again, and the operating cycle repeats with primary triggering and the initiation of the secondary triggering period.

The waveforms of FIG. 11 illustrate the voltage $V_{AGD}$ between the node A of the ISP 70 and ground (waveforms 376 and 378), the positive rail voltage of the ISP control and firing circuit 74 (waveform 380), the output of comparitor 134 (B3)(waveforms 384 and 386), the signal at the non-inverting input of comparitor 196 (A2)(waveform 388), and the gate drive signal for the auxiliary bypass path MOSFETs 104–109 (waveform 390). Note that waveforms 376, 380, and 384 are illustrated on the same scale with respect to each other, as are waveforms 378, 386, 388, and 390. As illustrated by waveforms 376, 380, and 384, as the voltage across the ISP 70 reaches the primary voltage trigger level, the positive rail voltage 380 reaches its highest voltage level. At this point, when the primary voltage trigger level is reached, the output 384 of comparitor 134 (B3) goes high, causing the main bypass path SCRs 84 and 86 to be triggered, and initiating the secondary triggering period. During the secondary triggering period, the voltage 376 across the ISP drops to below the secondary voltage trigger level, which is below the positive rail voltage stored on capacitors 110 and 122. Thus, the positive rail voltage begins to decline. When the positive rail voltage declines to a voltage level such that the lower voltage level established by hysteresis around the comparitor 134 (B3) is reached, the output of comparitor 134 (B3) drops, and the secondary triggering period is terminated.

As illustrated by waveforms 378, 386, 388, and 390, when the output 386 of the comparitor 134 (B3) drops, indicating termination of the secondary triggering period, the non-inverting input 388 of comparitor 196 (A2) is allowed to drop as well. This causes the output of the comparitor 196 (A2) to drop, and, following a delay, and if other conditions are satisfied, e.g., the positive rail voltage is greater than the undervoltage trip level, a gate drive signal 390 is delivered to the auxiliary bypass path MOSFETs 104–109 for, e.g., 2 ms, to turn them on, thereby creating a low impedance bypass path around the main bypass path SCRs 84 and 86, to thereby commutate the main bypass path SCRs off.

In FIG. 12, voltage waveforms for the voltage $V_{AGD}$ between the node A of the ISP control and firing circuit 74 and ground (waveforms 392 and 394), the gate drive signal provided to the auxiliary bypass path MOSFETs 104–109 (waveforms 396 and 398), the signal at the non-inverting input of comparitor 240 (A4)(waveforms 400 and 402), and the gate drive signals for the voltage clamp MOSFET 230 (waveforms 404 and 406) are illustrated. Waveforms 392, 396, 400, and 404 are illustrated on the same scale with respect to each other, as are waveforms 394, 398, 402, and 406. As illustrated by these waveforms, following the termination of the gate drive signal 396 and 398 to the auxiliary bypass path MOSFETs 104–109, and with the main bypass path SCRs 84 and 86 now turned off, the voltage 392 and 394 across the ISP begins to rise. During the period when the auxiliary bypass path MOSFET gate drive signal 396 and 398 is active, capacitor 230 is charged, and the non-inverting input 400 and 402 of comparitor 240 (A4) rises to a selected voltage level. After the auxiliary bypass path MOSFET gate drive signal 396 and 398 is terminated, the capacitor 230 begins to discharge, and the non-inverting input 400 and 402 to comparitor 240 (A4) begins to decline. As long as the non-inverting input of comparitor A4 is above a selected voltage level, however, the voltage clamping period of, e.g., about 1 second, is enabled. During the voltage clamping period, whenever the voltage across the ISP reaches the voltage clamping voltage level, gate drive signals 404 and 406 are delivered to the voltage clamp MOSFET 230 to provide for dissipation of stored system energies through the resistors 232–236. The voltage clamping period continues until the non-inverting input 400 and 402 of comparitor 240 (A4) decays to the selected voltage level, at which point the gate drive signals 404 and 406 delivered to the voltage clamp MOSFET 230 are terminated. At this point, the ISP control and firing circuit 74 reenters its dormant state, and, with the main bypass path SCRs 84 and 86 now turned off, the ISP 70 enters into a DC blocking mode, and the voltage 392 and 394 across the ISP begins to rise toward the primary voltage trigger level once again.

Figure 13:
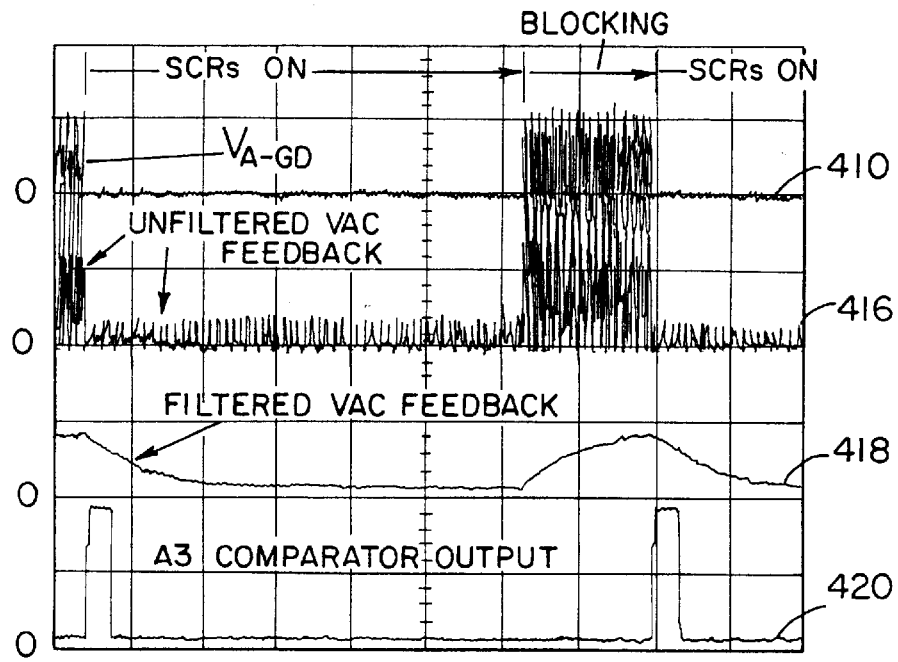
FIG. 13 is a waveform diagram illustrating various voltage waveforms for an isolator surge protector control and firing circuit in accordance with the present invention operating under abnormally high AC current and zero DC bias voltage operating conditions.
Figure 13:
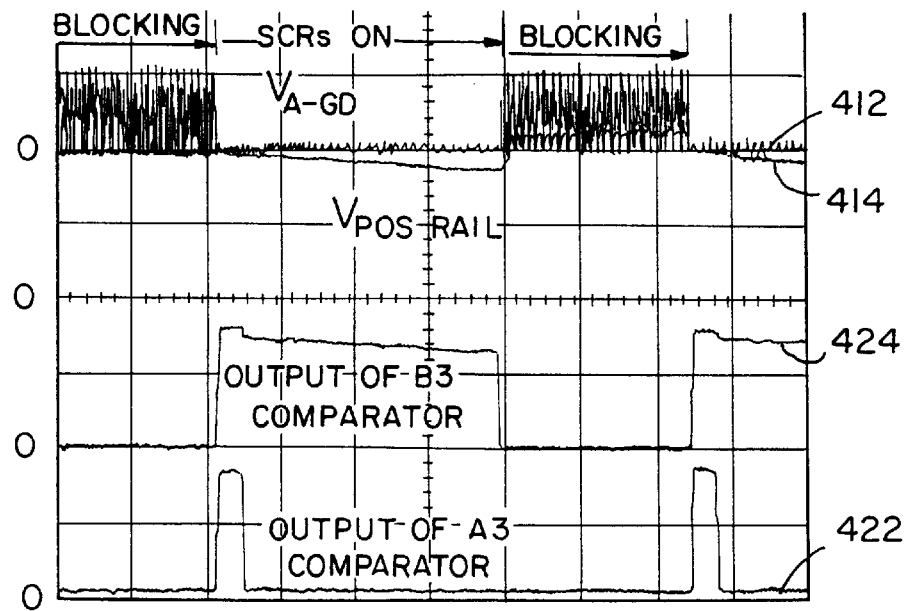

Operation of the exemplary ISP control and firing circuit 74 for providing current dependent primary triggering is illustrated by the waveforms of FIG. 13. These test waveforms were obtained for an ISP with a peak AC voltage level corresponding to the primary current trigger level (at 60 Hz) set to 11.5V (option 2). No DC bias was applied to the ISP for this test. FIG. 13 illustrates the voltage $V_{AGD}$ between the A node of the ISP 70 and ground (waveforms 410 and 412), the positive rail voltage of the ISP control and firing circuit (waveform 414), the unfiltered AC feedback voltage across resistor 264 (waveform 416), the filtered AC voltage feedback waveform across capacitor 272 (C13)(waveform 418), the output of comparitor 276 (A3)(waveforms 420 and 422), and the output of comparitor 134 (B3)(waveform 424). Note that waveforms 410, 416, 418 and 420 are illustrated on the same scale with respect to each other, as are waveforms 412, 414, 424, and 422. As illustrated, when the filtered voltage 418 across capacitor 272 (C13) reaches a peak voltage level, e.g., 0.4V, corresponding to the primary current trigger level, the output 420 and 422 of comparitor 276 (A3) goes high. This causes the output 424 of comparitor 134 (B3) to also go high, thereby triggering the main bypass path SCRs 84 and 86 into conduction, and initiating the secondary triggering period. With the main bypass path SCRs on and conducting, the voltage 410 and 412 across the ISP, and the unfiltered AC voltage 416 across resistor 264 drops. Thus, the filtered AC feedback voltage 418 across capacitor 272 (C13) begins to decay. When the filtered AC feedback voltage 418 across capacitor 272 (C13) falls to about, e.g., 0.28V, the output 420 and 422 of comparitor 276 (A3) goes low. However, the output 424 of comparitor 134 (B3) remains high until the positive rail voltage 414 declines to a level below the lower voltage level established by the hysteresis around comparitor 134 (B3), causing the output 424 of comparitor 134 (B3) to drop, thereby terminating the secondary triggering period. After the secondary triggering period is terminated, the main bypass path SCRs 84 and 86 are turned off, and the AC voltage applied across the ISP causes the filtered AC feedback voltage across capacitor 272 (C13) to increase towards the selected voltage trigger level. Once the trigger level is reached, the output of comparitor 276 (A3) goes high, primary triggering occurs, and the cycle repeats itself. (Note that for the test waveforms illustrated in FIG. 13, since no DC signal is applied to the ISP, commutation of the main bypass path SCRs 84 and 86 using the auxiliary bypass path MOSFETs 104–109, and voltage clamping to dissipate stored DC system energies is not required).

For the test waveforms illustrated in FIG. 13, an AC signal with a peak AC voltage equal to the design trigger level of 11.5V was applied. In this case, the main bypass path SCRs 84 and 85 conduct for a period of about 1.8 seconds, i.e., the secondary triggering period has a duration of 1.8 seconds, and DC blocking occurs for about 1.3 seconds. At higher levels of AC current, the SCR conduction time increases relative to the blocking time, keeping the rms current through the DC blocking capacitor 76 well within the rating of the capacitor. Similarly, at lower levels of AC current, the SCR conduction time decreases relative to the blocking time.

Figure 9:
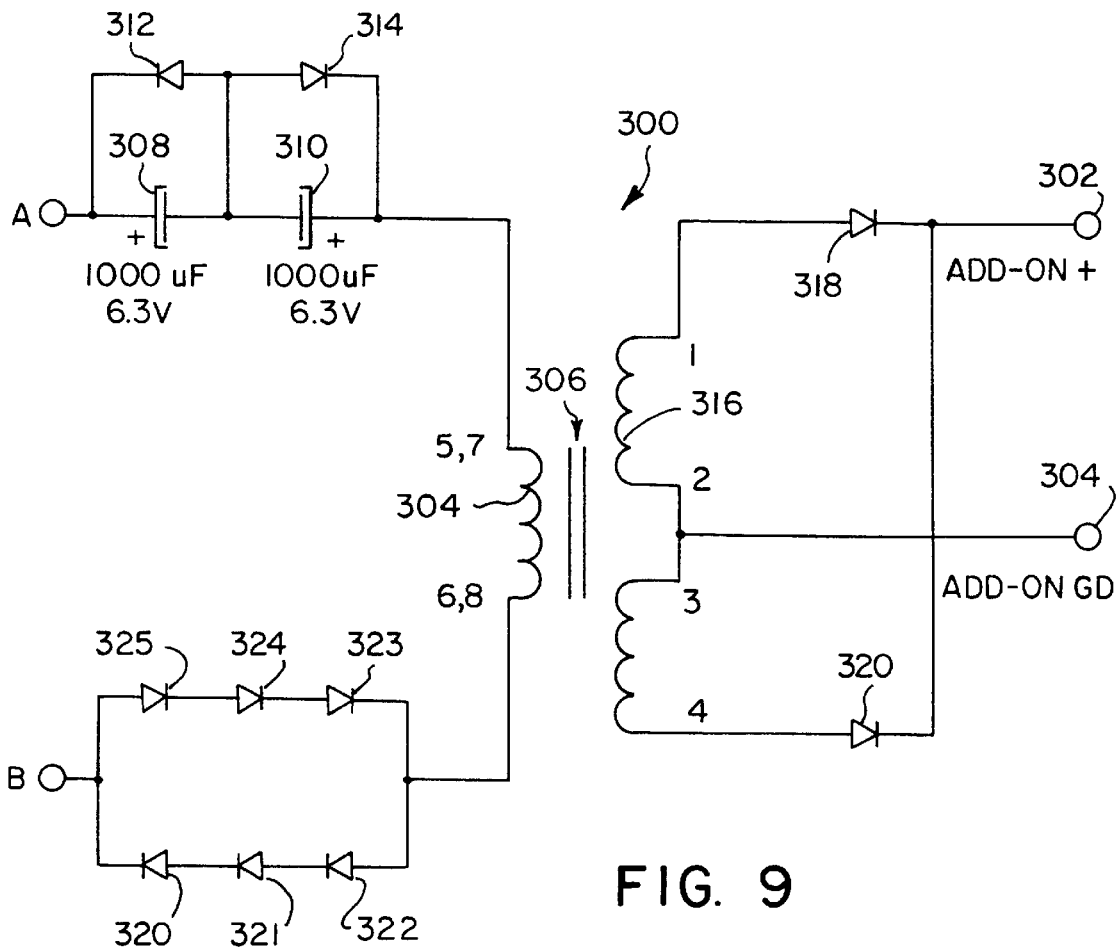
FIG. 9 is a detailed schematic circuit diagram of the voltage boosting add-on circuit of FIG. 8.
Figure 14:
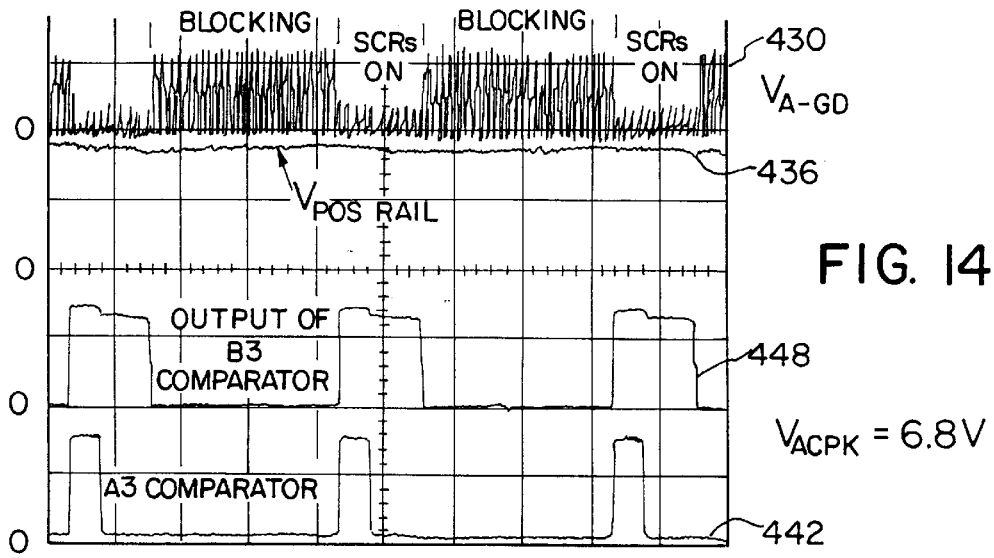
FIGS. 14–16 are waveform diagrams illustrating various voltage waveforms for an isolator surge protector control and firing circuit in accordance with the present invention operating under various abnormally high AC current operating conditions.
Figure 15:
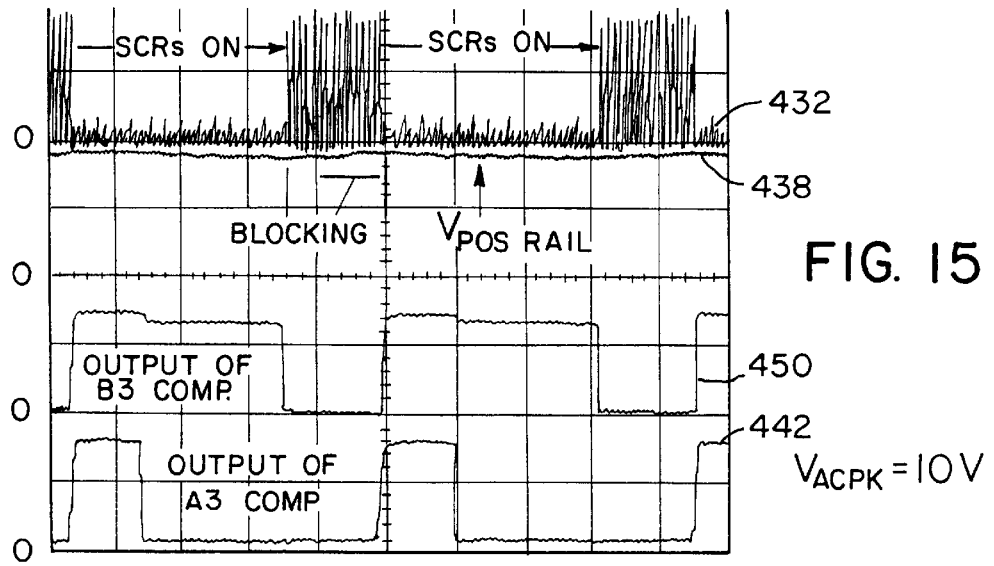
Figure 16:
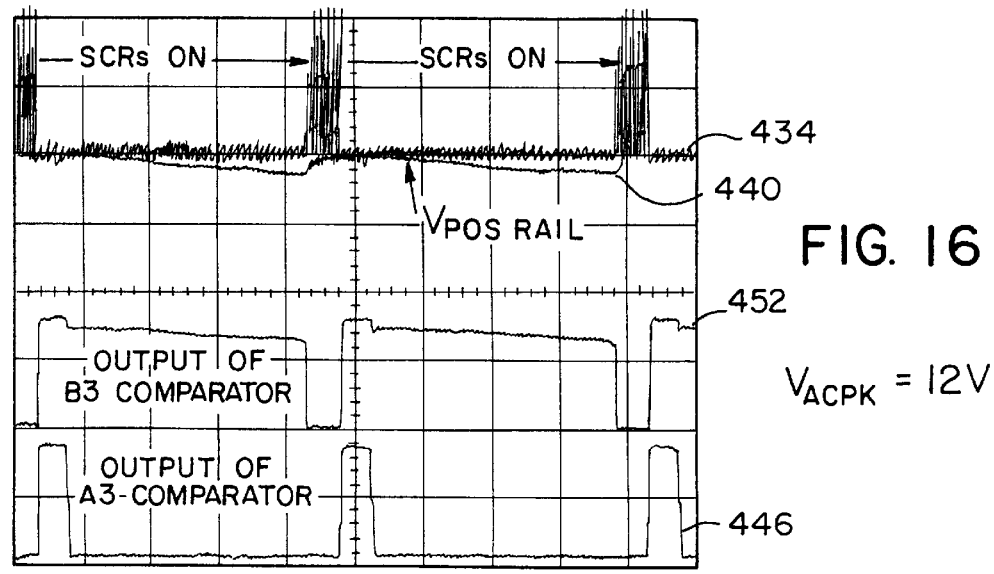

FIGS. 14, 15, and 16 illustrate the voltage $V_{AGD}$ between the node A of the ISP 70 and ground (waveforms 430, 432, and 434), the positive rail voltage of the ISP control and firing circuit 74 (waveforms 436, 438, and 440), the output of the comparitor 276 (A3)(waveforms 442, 444, and 446), and the output of the comparitor 134 (B3)(waveforms 448, 450, and 452), when AC voltage waveforms having peak voltages of 6.8V, 10V, and 12V, respectively, are applied to an ISP 70 in accordance with the present invention with the voltage boosting add-on circuit of FIG. 9 and the peak AC voltage triggering level corresponding to the primary current trigger level set to 6.8V. No DC bias voltage was applied to the ISP 70 to obtain these test waveforms. For the peak applied AC voltage level of 6.8V, the main bypass path SCRs 84 and 86 conduct for a period of about 550 milliseconds, and block for about 950 milliseconds. As illustrated in FIGS. 15 and 16, as the peak applied AC voltage increases to 10 and 12 volts, the SCR conduction period increases relative to the blocking period. This keeps the rms current in the DC blocking capacitor 76 within the capacitor component rating.

Figure 17:
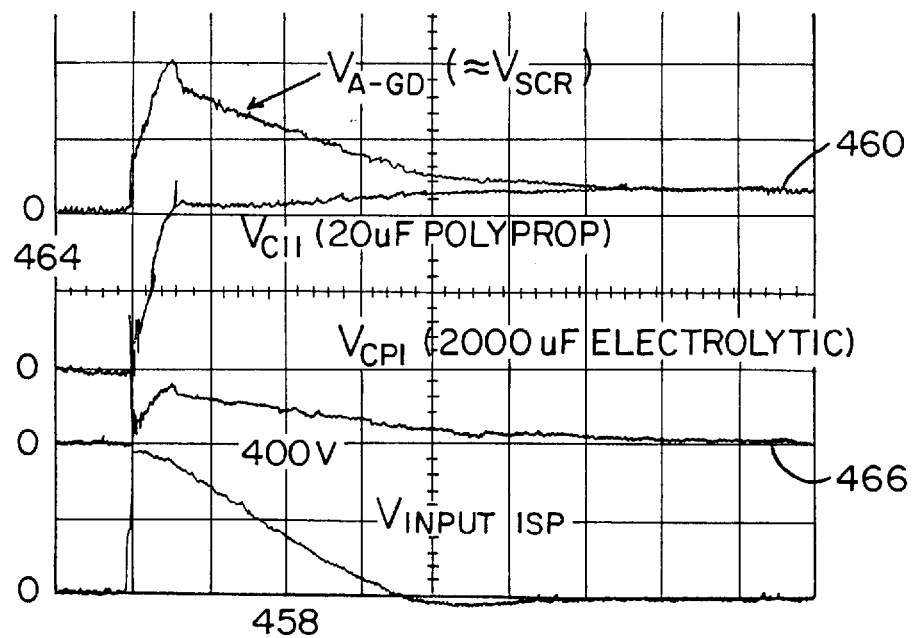
FIG. 17 is a waveform diagram illustrating operation of an isolator surge protector control and firing circuit in accordance with the present invention under simulated lightning strike conditions.
Figure 17:
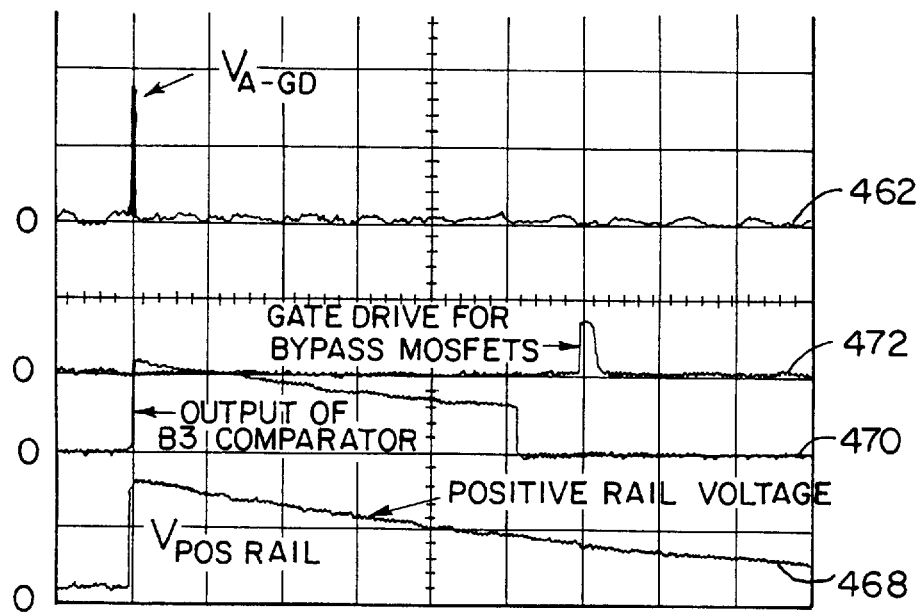

The waveforms of FIG. 17 illustrate operation of the exemplary ISP control and firing circuit 74 under simulated lightning strike conditions. The simulated lightning strike voltage signal applied across the input terminals 80 and 82 of the ISP 70 is illustrated by waveform 458. The voltage $V_{AGD}$ between the node A of the ISP 70 and ground is illustrated by waveforms 460 and 462. The voltage level across the low inductance storage capacitor 110 is illustrated by waveform 464. The voltage level across the electrolytic storage capacitor 122 is illustrated by waveform 466. The positive rail voltage in the ISP control and firing circuit 74 is illustrated by waveform 468. The output of comparitor 134 (B3) is illustrated by waveform 470. Waveform 472 illustrates the application of a gate drive signal to the auxiliary bypass path MOSFETs 104–109. Waveforms 458, 460, 464, and 466 are illustrated on the same scale with respect to each other, as are waveforms 462, 468, 470 and 472. As illustrated, the simulated lightning strike 458 causes the voltage 460 and 462 at the terminals of the ISP 70, the voltage 464 across the low inductance capacitor 110, and the positive rail voltage 468 to rise rapidly. Though the peak transient input voltage is about 400 volts, in this case, the voltage $V_{AGD}$ that actually appears across the DC blocking capacitor 76 is limited to about 20V, because the bypass path SCR 84 is fired via the auxiliary firing mechanism of zener diode 330. The bulk of the 400V transient is developed across the series inductor 78 in the ISP. The low inductance storage capacitor 110 captures the full 20V that appears briefly across the ISP. The electrolytic storage capacitor 122, on the other hand, does not capture significant energy, because of its higher internal inductance. The positive rail voltage 468 rises more slowly than the voltage 464 across the low inductance capacitor 110, because of the time delay of resistor 112 and capacitor 116. The rise time of the positive rail voltage 468 is much too slow to allow main bypass path SCR triggering via the pulse transformer 176. Waveform 470 illustrates that the output of the comparitor 134 (B3) goes low about 100 milliseconds after the lightning strike, i.e., when the positive rail voltage has decayed to about 8V. The gate drive pulse 472 for the auxiliary bypass path MOSFETs 104–109 is delayed by about 20 ms after the output of comparitor 134 (B3) goes low. The turning on of the auxiliary bypass path MOSFETs 104–109 turns off the main bypass path SCRs, as previously described.

It is understood that the invention is not confined to the particular embodiments, applications and arrangements of parts herein illustrated and described, but embraces such modified forms thereof as come within the scope of the following claims.

What is claimed is:

1. An isolator surge protector, comprising:
   (a) a DC blocking capacitor connected between two terminals of the isolator surge protector;
   (b) a main bypass path connected in parallel with the DC blocking capacitor and including a main bypass path switching device which is responsive to primary and secondary triggering signals to create a low impedance path between the terminals of the isolator surge protector and across the DC blocking capacitor such that the DC blocking capacitor discharges rapidly through the low-impedance path; and
   (c) controller means for providing the primary triggering signal when a voltage level of an externally applied input voltage waveform across the main bypass path exceeds a primary voltage trigger level and for providing secondary triggering signals each time the voltage level across the main bypass path exceeds a secondary voltage trigger level which is less than the primary voltage trigger level during a secondary triggering period having a duration following the providing of the primary triggering signal lasting for a Plurality of cycles of the input voltage waveform; wherein the controller means includes a capacitor that is charged by the voltage level across the main bypass path prior to the providing of the primary triggering signal and wherein the primary triggering signal is provided when the voltage level across the capacitor exceeds a first voltage level and the secondary triggering period is terminated when the capacitor discharges to a second voltage level.

2. An isolator surge protector, comprising:
   (a) a DC blocking capacitor connected between two terminals of the isolator surge protector;
   (b) a main bypass path connected in parallel with the DC blocking capacitor and including a main bypass path switching device which is responsive to primary and secondary triggering signals to create a low impedance path between the terminals of the isolator surge protector and across the DC blocking capacitor such that the DC blocking capacitor discharges rapidly through the low-impedance path; and
   (c) controller means for providing the primary triggering signal when a voltage level of an externally applied input voltage waveform across the main bypass path exceeds a primary voltage trigger level and for providing secondary triggering signals each time the voltage level across the main bypass path exceeds a secondary voltage trigger level which is less than the primary voltage trigger level during a secondary triggering period having a duration following the providing of the primary triggering signal lasting for a plurality of cycles of the input voltage waveform; wherein the controller means is autonomous and includes a diode and a storage capacitor connected across the main bypass path, wherein the controller means is powered from energy stored in the storage capacitor from the voltage level across the main bypass path prior to the providing of the primary triggering signal which provides current through the diode into the capacitor.

3. An isolator surge protector, comprising:
(a) a DC blocking capacitor connected between two terminals of the isolator surge protector;
(b) a main bypass path connected in parallel with the DC blocking capacitor and including a main bypass path switching device which is responsive to primary and secondary triggering signals to create a low impedance path between the terminals of the isolator surge protector and across the DC blocking capacitor such that the DC blocking capacitor discharges rapidly through the low-impedance path; and
(c) controller means for providing the primary triggering signal when a voltage level of an externally applied input voltage waveform across the main bypass path exceeds a primary voltage trigger level and when an AC current level through the DC blocking capacitor exceeds a primary current trigger level when the voltage level across the main bypass path is less than the primary voltage trigger level and for providing secondary triggering signals each time the voltage level across the main bypass path exceeds a secondary voltage trigger level which is less than the primary voltage trigger level during a secondary triggering period having a duration following the providing of the primary triggering signal lasting for a plurality of cycles of the input voltage waveform.

4. An isolator surge protector, comprising:
(a) a DC blocking capacitor connected between two terminals of the isolator surge protector;
(b) a main bypass path connected in parallel with the DC blocking capacitor and including a main bypass path switching device which is responsive to primary and secondary triggering signals to create a low impedance path between the terminals of the isolator surge protector; and
(c) controller means for providing the primary triggering signal both when a voltage level across the main bypass path exceeds a primary voltage trigger level and when an AC current level through the DC blocking capacitor exceeds a primary current trigger level when the voltage level across the main bypass path is less than the primary voltage trigger level, and for providing secondary triggering signals each time the voltage level across the main bypass path exceeds a secondary voltage trigger level which is less than the primary voltage trigger level during a secondary triggering period following the providing of the primary triggering signal.

5. The isolator surge protector of claim 4 wherein the main bypass path includes at least two SCRs connected in anti-parallel.

6. The isolator surge protector of claim 4 wherein the controller means includes a capacitor that is charged by the voltage level across the main bypass path prior to the providing of the primary triggering signal and wherein the primary triggering signal is provided when the voltage level across the capacitor exceeds a first voltage level and the secondary triggering period is terminated when the capacitor discharges to a second voltage level.

7. The isolator surge protector of claim 4 wherein the controller means is autonomous and includes a diode and a storage capacitor connected across the main bypass path, wherein the controller means is powered from energy stored in the storage capacitor from the voltage level across the main bypass path prior to the providing of the primary triggering signal which provides current through the diode into the storage capacitor.

8. The isolator surge protector of claim 7 comprising additionally a voltage boosting add-on circuit connected across the main bypass path and including means for boosting the voltage level across the main bypass path prior to the providing of the primary triggering signal and providing the boosted voltage level across the storage capacitor to thereby store sufficient energy in the storage capacitor to power the controller means to provide the primary triggering signal when the AC current through the DC blocking capacitor exceeds the primary current trigger level when the voltage level across the main bypass path is less than the primary voltage trigger level.

9. The isolator surge protector of claim 8 wherein the voltage boosting add-on circuit includes a voltage boosting transformer.

10. The isolator surge protector of claim 4 comprising additionally warning means for providing an indication when the voltage level across the main bypass path exceeds the primary voltage trigger level or the AC current through the DC blocking capacitor exceeds the primary current trigger level.

11. The isolator surge protector of claim 10 wherein the warning means includes an LED and means for causing the LED to flash on for a period each time primary triggering occurs.

12. The isolator surge protector of claim 4 comprising additionally an auxiliary bypass path connected in parallel with the main bypass path and including an auxiliary bypass path switching device responsive to auxiliary bypass path switching signals to create a low impedance auxiliary bypass path across the main bypass path switching device, and wherein the controller means includes means for providing an auxiliary bypass path switching signal following the secondary triggering period to thereby shunt any current from the main bypass path switching device through the auxiliary bypass path to commutate the main bypass path switching device off.

13. The isolator surge protector of claim 12 wherein the auxiliary bypass path includes at least one MOSFET connected in parallel with the main bypass path and responsive to the auxiliary bypass path switching signal.

14. The isolator surge protector of claim 4 comprising additionally a voltage clamp circuit connected across the main bypass path, and wherein the controller means includes means for controlling the voltage clamp circuit during a voltage clamping period following the secondary triggering period to dissipate DC energy stored in system inductances.

15. The isolator surge protector of claim 14 wherein the voltage clamp circuit includes a voltage clamp switching device connected in series with at least one resistor and wherein the means for controlling the voltage clamp circuit includes means for turning on the voltage clamp switching device at a voltage clamp voltage level across the voltage clamp circuit that is less than the primary voltage trigger level to thereby dissipate energy in the resistor.

16. An isolator surge protector, comprising:
(a) a DC blocking capacitor connected between two terminals of the isolator surge protector;
(b) a main bypass path connected in parallel with the DC blocking capacitor and including a main bypass path switching device which is responsive to primary and secondary triggering signals to create a low impedance path between the terminals of the isolator surge protector; and
(c) controller means for providing the primary triggering signal when an AC current level through the DC blocking capacitor exceeds a primary current trigger level, and for providing secondary triggering signals each time the voltage level across the main bypass path exceeds a secondary voltage trigger level during a secondary triggering period following the providing of the primary triggering signal.

17. The isolator surge protector of claim 16 wherein the controller means is autonomous and includes a diode and a storage capacitor connected across the main bypass path, wherein the controller means is powered from energy stored in the storage capacitor from the voltage level across the main bypass path prior to the providing of the primary triggering signal which provides current through the diode into the storage capacitor.

18. The isolator surge protector of claim 17 comprising additionally a voltage boosting add-on circuit connected across the main bypass path and including means for boosting the voltage level across the main bypass path prior to the providing of the primary triggering signal and for providing the boosted voltage level across the storage capacitor to thereby store sufficient energy in the storage capacitor to power the controller means to provide the primary triggering signal when the AC current through the DC blocking capacitor exceeds the primary current trigger level.

19. The isolator surge protector of claim 18 wherein the voltage boosting add-on circuit includes a voltage boosting transformer.

20. The isolator surge protector of claim 16 comprising additionally warning means for providing an indication when the AC current through the DC blocking capacitor exceeds the primary current trigger level.

21. The isolator surge protector of claim 20 wherein the warning means includes an LED and means for causing the LED to flash on for a period each time primary triggering occurs.

22. A method for controlling an isolator surge protector having a DC blocking capacitor connected between two terminals of the isolator surge protector and a main bypass path connected in parallel with the DC blocking capacitor and including a main bypass path switching device which is responsive to triggering signals to create a low impedance path between the terminals of the isolator surge protector and across the DC blocking capacitor such that the DC blocking capacitor discharges rapidly through the low impedance path, comprising the steps of:

(a) providing a primary triggering signal when a voltage level of an externally applied input voltage waveform across the main bypass path exceeds a primary voltage trigger level and when an AC current level through the DC blocking capacitor exceeds a primary current trigger level when the voltage level across the main bypass is less than the primary voltage trigger level; and (b) providing secondary triggering signals each time the voltage level of the externally applied input voltage waveform across the main bypass path exceeds a secondary voltage trigger level which is less than the primary voltage trigger level during a secondary triggering period having a duration following the step of providing of the primary triggering signal lasting for a plurality of cycles of the input voltage waveform.

23. The method of claim 22 comprising additionally the step of providing an indication when the voltage level across the main bypass path exceeds the primary voltage trigger level or the AC current through the DC blocking capacitor exceeds the primary current trigger level.

24. The method of claim 23 wherein the step of providing an indication includes the step of providing a visual indication each time primary triggering occurs.

* * * * *